United States Patent [19]
Janssen et al.

[11] Patent Number: 6,084,030
[45] Date of Patent: *Jul. 4, 2000

[54] BRANCHED POLYMERS WITH POLYOLEFIN ARMS

[75] Inventors: Koen Jan Gerarda Janssen, Martenslinde, Belgium; Gerardus Arnoldus Rademakers, Heerlen, Netherlands; Jacob Renkema; Petronella Danielle Verweij, both of Sittard, Netherlands

[73] Assignee: DSM Copolymer, Inc., Geleen, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/511,402

[22] Filed: Aug. 4, 1995

[51] Int. Cl.$^7$ ....................................................... C08G 81/02
[52] U.S. Cl. ............................ 525/100; 525/105; 525/106
[58] Field of Search ............................... 525/71, 191, 240, 525/100, 105, 106

[56] References Cited

U.S. PATENT DOCUMENTS

| | | | |
|---|---|---|---|
| 4,906,705 | 3/1990 | Peng | 525/333.7 |
| 5,030,695 | 7/1991 | Cozewith | 525/207 |
| 5,276,110 | 1/1994 | Zhou | 525/479 |
| 5,395,885 | 3/1995 | Kennedy | 525/98 |
| 5,663,245 | 9/1997 | Kennedy et al. | 525/479 |
| 5,708,115 | 1/1998 | Graiver et al. | 528/32 |

FOREIGN PATENT DOCUMENTS 0217505  12/1983  Japan.

*Primary Examiner*—Jeffrey C. Mullis
*Attorney, Agent, or Firm*—Rockey, Milnamow & Katz, Ltd.

[57] ABSTRACT

A highly branched polymer in the form of a comb, star, nanogel and structural combinations thereof in which a plurality of polyolefin arms formed of polymers of 1-alkenes are attached to a backbone having repeating units containing aliphatic groups, aromatic groups, heteroatom-containing groups and combinations thereof.

19 Claims, No Drawings

BRANCHED POLYMERS WITH POLYOLEFIN ARMS

This invention relates to branched polymers, and particularly to branched polymers containing a polymeric backbone with branches extending therefrom in which the branches are formed of polyolefins.

BACKGROUND OF THE INVENTION

As is now well-known in the art, the term polymer refers to a molecule made up by the repetition of simpler units often referred to as the mer or monomer units. Synthetic polymers can generally take one of two structural forms; in one form, they are linear polymers in which case the monomeric units making up the polymer are linearly arranged. Alternatively, the polymer structure may be branched in which portions of either the backbone or individual repeating units are discrete and emanate from the backbone of the polymer.

Thus, the simplest linear polymers may be represented by polyethylene and polypropylene in which repeating ethylenic units form the linear chain. In polypropylene, the polymer is made up of repeating ethylene units, each having pendant methyl groups extending therefrom. It is, of course, well-known that both polyethylene and polypropylene can be formed as branched polymers, by reactions such as free radical reactions. In such crosslinked polymers, many of the individual branches of the polymer extend from the linear polyethylene and polypropylene chains. It is, of course, also possible to introduce crosslinking monomers to crosslink linear chains each with the other.

Branching of the type referred to above is random in nature. For that reason, it is generally not possible to either control the extent of branching or the composition of the branches.

Various types of more complex branched polymers are known in the art. One such example includes the so-called star polymers such as those described in U.S. Pat. No. 3,985,830. In such star polymers, the molecule is formed from a nucleus from which polymeric arms extend in a radial fashion. In the star polymers of the type described in the foregoing patent, the molecular weight of the nucleus is essentially negligible as compared to the molecular weight of the polymer as a whole. The polymer system described in the foregoing patent utilizes what is known in the art as a living catalyst in which the chain growth of various branches begins essentially simultaneously and continues until terminated by the addition of a monomer to stop chain growth.

Another type of branching, sometimes referred to as a comb, is produced when branches extend, either regularly or irregularly, from a polymeric backbone.

Various attempts have been made in the prior art to provide methods for linking polymer chains. For example, in published Japanese Application No. 58-217505, there is described a technique to increase the molecular weight of polymers of ethylene, or copolymers of ethylene or other alpha-olefins, in which two polyolefin chains are bonded together or coupled by means of disiloxane. In the teachings of that patent application, there is described a high temperature technique for producing polyolefins which inherently provides polymer chains having a relatively low molecular weight. Thus, the patent teaches that the molecular weight, and hence viscosity, of the polymer chain, can be increased by coupling together two of the chains. Thus, the published Japanese application does not disclose or suggest a technique to provide highly branched polyolefins.

In published Application No. WO87/03603 there is purportedly described a technique for producing polyolefin star polymers. In one example, there is described nodular ethylene propylene copolymers in which ethylene, propylene and norbornadiene are copolymerized to form a nodular branched structure to which additional monomers are added to lengthen the nodular arms. Methylacrylate is then added to cap the arms. Another example purports to describe the reaction of a hydroxy terminated ethylene propylene copolymer which is then dissolved in a dry lubricating oil and reacted with a polyfunctional isocyanate. No reaction conditions of any kind nor any structural characterizations of the polymer are provided.

Thus, there is a need to provide highly branched polymer structures and techniques for their production which overcome the foregoing deficiencies of the prior art.

It is an object of the present invention to provide highly branched polymers in which the branches are formed from polyolefin polymers.

It is a more specific object of the invention to provide highly branched polymers in which polyolefin arms are linked to a polymeric backbone to provide a highly branched polymer structure, characterized as a comb, star, nanogel or combinations thereof.

It is yet another object of the invention to provide highly branched polymers and a technique for the preparation of highly branched polymers containing polyolefin arms in which it is possible to control the composition of the polyolefin arms as to the type of monomer(s), quantity of monomer(s), monomer distribution, molecular weight and molecular weight distribution.

It is a further object of the invention to provide highly branched polymers and a technique for their preparation in which it is possible to control the composition of the polymer by controlling the degree of branching or number of arms coupled to the polymer backbone.

It is a final object of the invention to provide comb, star, nanogel type branched polymers wherein the polyolefin arms can be post functionalized by other chemical reactions.

SUMMARY OF THE INVENTION

The concepts of the present invention reside in a highly branched polyolefin polymer in the form of a comb, star, nanogel or structural combinations thereof, whereby a plurality of polyolefin arms are linked to a polymeric backbone to provide a highly branched structure in which the properties of the highly branched structure can be conveniently tailored to the application for which the polymer is used. Unlike the prior art, the concepts of the present invention use as the backbone a polymeric structure to which polyolefin arms are linked. Through the use of a polymeric backbone, it is possible to obtain very highly branched polymeric structures in which a relatively high number of branches or arms can be provided on the polymeric backbone. The choice of specific reactive polymeric backbone and/or its manner of preparation controls the branched structure as to comb, star, nanogel or structural combinations thereof. That allows for the preparation of polymers having relatively low viscosities compared to their linear counterparts at the same absolute molecular weight.

Concepts of the present invention rely on chemical reactions which afford the coupling or linking together of polyolefin pre-arms into combs, stars, nanogels or structural combinations thereof. Branched polymer compositions of the present invention result from either a coupling reaction between a reactive polymeric backbone containing functionality capable of reaction with a polyolefin pre-arm or a polymerization reaction between polyolefin pre-arms derivatized for such polymerization reactions. By polyolefin pre-arm is meant a polyolefin polymer derivatized, preferably at its terminus, so that it can react with a functional polymer or a difunctional polymerizable monomer. Use of a polyolefin pre-arm allows for control of the polyolefin composition independently of the reaction to form the branched polyolefin.

Reactive polymers useful as backbones are preformed polymers with a selectable number of functional groups or chemically reactive sites that will couple with the polyolefin pre-arm. Alternatively, the backbone is formed by a polymerization reaction using a polyolefin pre-arm first derivatized with a difunctional polymerizable monomer, either alone or in combination with another monomer copolymerizable therewith. Selective use of the polymeric backbone allows one to control the distribution of the polyolefin arms, thus controlling the degree of branching (number of arms) and the type of branchings that is, comb, star, nanogel or combinations thereof.

The polymers of the present invention are useful in a wide variety of applications. Thus, the broad scope of application of the polymers of the present invention is made possible by the ability to control in independent chemical reactions both the composition of the arms and the number of arms linked to the polymer backbone. Thus, the choice of the composition of the arms will largely determine the properties of the polymer, such as whether it is an elastomeric polymer, a thermoplastic polymer and the like.

In general, the polymers of the present invention have outstanding resistance to weathering, good aging properties when subjected to elevated temperatures and can be compounded with fillers and plasticizers in the production of low cost plastics useful as automotive and industrial components. Typical of such applications are those involving radiator hoses, weather stripping and gasket seals. The polymers of the present invention can also be used in the insulation of electrical wire and cables and also can be used as modifiers for various types of thermoplastics. In addition, the polymers of the present invention can likewise be used in the formulation of adhesives and as additives for lubricating oils.

DETAILED DESCRIPTION OF THE INVENTION

One of the advantages of the branched polymers of the present invention is the ability to provide a highly branched polymer structure that is achieved in part through the use, as the polymeric backbone, of a polymeric backbone structure. Polymeric backbones in the practice of this invention are preformed polymers having a known or selectable number of functional groups or chemically reactive sites that can be used to couple with the polyolefin pre-arm. Reactive polymeric structures useful as backbones are polymers possessing functionality which is either (a) capable of directly reacting with unsaturation contained in a polyolefin pre-arms or (b) capable of undergoing coupling reactions by which polyolefin pre-arms have been derivatized for a compatible reaction with the functional group on the reactive polymeric backbone. The reactive polymers provide a large numbers of coupling sites by which a large number of polyolefin pre-arms can be linked to the polymeric backbone to thus enable control of both the extent of branching and the type of branched structure. The prior art, teaching as it does the use of generally monomeric multi-functional nuclei, is incapable of providing these highly branched polymer structures.

Branched polymers of the present invention have polyolefin arms or branches comprised of polymers of 1-alkenes, and preferably predominately ethylene and/or other 1-alkenes with 3 to 20 carbon atoms. By the term "polyolefin pre-arm" is meant a polyolefin polymer derivatized, preferably at its terminus, so that it can react with a reactive polymeric backbone or a difunctional polymerizable monomer. Derivatized as used herein likewise includes polyolefin polymers having terminal unsaturation.

In the preferred practice of the present invention, the polyolefin pre-arm, preferably contains, prior to derivatization or coupling with a reactive polymer or a difunctional polymerizable monomer, terminal unsaturation. That unsaturation is either vinyl, vinylidene, or vinylene unsaturation. Terminal unsaturation is preferred in order to reduce the steric effects resulting from reaction between two polymeric molecules.

Polyolefin pre-arms can be derivatized for reaction with a reactive polymeric backbone or a difunctional monomer by many types of chemical reactions. Convenient examples of functional groups introduced to the polyolefin pre-arm to effect coupling include, but are not limited to carbon-to-carbon unsaturation in the form of vinyl, vinylene and vinylidene bonds, hydroxy, amino, peroxy, carboxylic acid, ester, halide, or anhydride, organoboron, cyano, isocyanato, carbon-carbon unsaturation that is polymerizable, thio, epoxy or aldehyde. Such derivatization methods will be presented in more detail as specific embodiments are defined.

Reactive polymer structures useful as backbones in the practice of this invention are very broad. Examples includes, but are not limited to the following classes: homo and copolymers of polyhydrosilanes, polyacrylic and methacrylic acids, polyacrylates, polymethacrylates, polyvinyl alcohol, polyvinyl acetate, poly(vinyl acetals), poly(vinyl ketals), ethylene copolymers with ethylenically unsaturated carboxylic acids, esters, or anhydrides, styrene copolymers with ethylenically unsaturated carboxylic acids, esters, or anhydrides, dendrimers, polythiols, polyepoxides, poly or extended isocyanates.

Use of a preformed reactive polymer as the backbone generally leads to a branched structure characterizable basically as a comb or star, depending to a significant degree on the molecular weight of the reactive polymeric backbone and the polyolefin pre-arms. Star branched polymers are those wherein the backbone exists as a radial core having attached to it the polyolefin arms. Reactive polymeric backbones that will generate a star structure are dendrimers and extended isocyanates or alternatively any backbone with a radial branched structure. Comb branched polymers are those wherein the polymeric backbone is essentially linear and the polyolefin arms extend pendant from that linear backbone. Thus, polyhydrosilanes, polymethacrylates, and ethylene copolymers are typical examples of reactive polymeric backbones that will provide a comb structure. Incorporation of a crosslinkable monomer during the coupling reaction can lead to a crosslinking of the comb or star structures via residual functionality on the backbone, thus generating a nanogel structure. The nanogel structure thus exists as a crosslinked core (crosslinkable monomer and backbone) with polyolefin arms attached to the core. Crosslink centers and thus a nanogel structure also results from reactions between functionality internal to the polyolefin arms and a crosslinkable monomer. Regardless of preparation technique, the nanogel structure will function as a star branched polymer. For that purpose, use can be made of conventional crosslinking agents well known to those skilled in the art, including such crosslinking agents as nonconjugated, unsaturated polyenes like 1,7-octadiene, ethylidene norbornene, divinyl benzene, divinyl silane, tri and tetravinyl silanes, trialkoxysilanes, trihalosilanes, alkoxyhalosilanes, alpha,omega-diamino alkenes and alpha, omega-dicarboxy alkenes.

In an alternative embodiment, the polymeric backbone is formed via a polymerization reaction between polymerizable monomers and polyolefin pre-arms that have been first derivatized with a difunctional polymerizable monomer leaving a polymerizable group capable of undergoing such polymerization reactions. Branched polymers thus formed will generally have comb structures. However, when the polyolefin pre-arm has a high molecular weight compared to the molecular weight of the backbone achieved during polymerization of the arms, the arms will fold to provide a physical star. In the event the polymerization reaction is carried out in the presence of a crosslinkable monomer a nanogel type structure will be formed. Thus, nanogel-type structures or a mixture of comb, star and nanogel will originate when combs and/or stars are further randomly branched by introduction of a crosslinkable monomer during preparation of the backbone.

The difunctional polymerizable monomer as used herein is a monomer possessing functionality that can selectively react with the terminal unsaturation or other terminal functionality of the polyolefin pre-arm, and possess other secondary functionality, reactive via a standard polymerization techniques such as cationic, anionic, free radical, Ziegler-Natta, etc., as a secondary reaction. Difunctional polymerizable monomers can be selected from the group comprising hydroalkoxysilanes, hydrohalosilanes, acrylic or methacrylic acids, their esters, amides, acid halides or anhydrides, vinyl acetate, vinyl alcohols, vinyl amines, vinylcyano compounds, vinyl isocyanates, vinyl thiols, vinyl epoxy compounds, etc.

The polyolefin pre-arms which can be used in the practice of the present invention depend in large measure on the properties desired in the branched polymer. In most embodiments, it is generally preferred, that the polyolefin pre-arm be formed of a polyolefin containing terminal unsaturation in the form of either vinyl, vinylidene, vinylene, or mixtures thereof. Use can be made of polyolefin homopolymers, such as polyethylene and polypropylene, but it is also possible, and sometimes preferred, to employ copolymers of one or more 1-alkenes or to employ copolymers of one or more 1-alkenes with other unsaturated monomers copolymerizable therewith. In general, use is made of polyolefin pre-arms formed by copolymerization of ethylene with at least one other 1-alkene. In addition, it is also possible to use, in combination with one or more of the monomers described above, one or more polyenes which either may or may not be functionalized. Also suitable as comonomers in the formation of the polyolefin pre-arms are functionalized ethylenically unsaturated monomers in which the functional group may be one or more polar groups capable of undergoing metallocene catalyzed polymerization.

The polyolefin pre-arms used in the practice of the present invention refer to and include polymers of 1-alkenes generally, and preferably ethylenepropylene copolymers or copolymers of ethylene and propylene with other 1-alkenes, as well as copolymers formed by the interpolymerization of ethylene, 1-alkenes and at least one other polyene monomer. Such polymers are themselves well known to those skilled in the art and are typically prepared by using conventional Ziegler or metallocene polymerization techniques well known to those skilled in the art. Both types of polymers hereinafter collectively are referred to as EP(D)M.

As will be appreciated by those skilled in the art, while propylene is a preferred monomer for copolymerization with ethylene and optionally a diene monomer, it will be understood that in place of propylene, use can be made of other 1-alkenes containing 4 to 16 carbon atoms. The use of such higher 1-alkenes together with or in place of propylene are well known to those skilled in the art and include, particularly, 1-butene and 1-octene.

When using an interpolymer of ethylene, 1-alkene and a polyene monomer, use can be made of a variety of polyene monomers known to those skilled in the art containing two or more carbon-to-carbon double bonds containing 4 to 20 carbon atoms, including non-cyclic polyene monomers, monocyclic polyene monomers and polycyclic polyene monomers. Representative of such compounds include 1,4-hexadiene, dicyclopentadiene, bicyclco(2,2,1)hepta-2,5-diene, commonly known as norbornadiene as well as the alkenyl norbornenes wherein the alkenyl group contains 1 to 20 carbon atoms and preferably 1 to 12 carbon atoms. Examples of some of the latter compounds includes 5-methylene-2-norbornene, 5-ethylidene-2-norbornene, vinyl norbornene as well as alkyl norbornadienes.

As known to those skilled in the art, it is also possible to include with certain Ziegler-Natta catalyst systems, as a comonomer in the polymerization of the polyolefin pre-arm, a small amount, typically up to 10 percent, of a functional ethylenically unsaturated monomer. Such monomers typically contain 2 to 20 carbon atoms and contain an ethylenically unsaturated group. Preferred functional ethylenically unsaturated monomers include acrylate and methacrylate esters wherein the ester group is $C_2$ to $C_{20}$ alkyl or $C_6$ to $C_{25}$ aryl including substituted aryl, vinyl amines, vinylcyano compounds and vinyl esters. Representative of suitable functional monomers which can be used in the practice of the present invention include methylmethacrylate, methylacrylate, N-vinylamine, N-vinylpyridine, acrylonitrile, vinyl acetate, etc.

In a particular practice of the present invention, the polyolefin pre-arm is produced using metallocene catalysts. As used herein, the term "metallocene catalyst system" refers to and includes the use of a transition metal compound comprising a metal such as titanium, zirconium, chromium, hafnium, yttrium containing at least one coordinating ligand that is a highly conjugated organic compound (e.g., cyclopentadienyl or indenyl). Such catalyst systems are themselves known and are described in the following published applications, the disclosures of which are incorporated herein by reference: EP-A-347,129; EP-A-69,951; EP-A-468,537; EP-A-500,944; and PCT/INL/93/00229. In addition, other Ziegler catalyst systems likewise known in the art as producing terminal unsaturation can likewise be used in the practice of this invention. One such example is titanium chloride supported on magnesium chloride and used in high temperature (greater than 100° C.) polymerization systems. Another example is the copolymerization of ethylene with higher 1-alkenes using $VOCl_3$ and diethylaluminum chloride. In general, the choice of catalyst system and polymerization conditions will depend on the specific type of polyolefin pre-arm desired, as known to those skilled in the art of Ziegler-Natta polymerization technology. Thus, the composition of the arms are dependent on the limits of Ziegler-Natta polymerization technology and can be controlled independent of the composition of the backbone.

Because the concepts of the present invention make it possible to introduce in a controlling fashion large numbers of polyolefin arms, the properties of the polyolefin arms linked to the polymeric backbone dominate the properties of the resulting branched polymer. Thus, the molecular weight of the polyolefin pre-arms can be varied to control the properties desired in the overall branched polymer. Similarly, the method of preparation of the pre-arms can be used to, in part, control over the properties of the arms. In general, the lengths of the arms, expressed as the number-average molecular weight, $M_n$, can be varied within broad limits, depending on the properties desired. As a general rule, use is made of polymer pre-arms having a $M_n$ between 50 and 100,000, and preferably between 100 and 80,000. It is generally preferred that the molecular weight distribution (MWD) of the arms be controlled to a level of at least 1.0, referring to the ratio between the weight-average molecular weight ($M_w$) and the number-average molecular weight ($M_n$) as determined by size exclusion chromatograph-differential viscometry (SEC-DV). Preferred arms used in the practice of the present invention have a MWD of at least 1.2 ranging up to 3.5.

The chemical reactions employed in the practice of this invention to couple the polyolefin pre-arm with the reactive polymer are generally known. Reaction times will generally be much longer in the practice of this invention than that practiced for the same chemical reaction with conventional monomeric chemicals.

As will be appreciated by those skilled in the art, as the molecular weight of the polyolefin pre-arm to be coupled with the backbone increases in molecular weight, the number of terminal double bonds in the polyolefin pre-arm decreases on a weight basis. That in turn results in a reduction of the coupling efficiency of the polyolefin pre-arms to the polymeric backbone. Thus, longer reaction times are required to produce the branched polymer of the invention. Similarly, steric factors can play a role in reducing the coupling efficiency, making it more difficult to couple the polyolefin pre-arm to adjacent functional groups in the backbone.

In short, the greater the molecular weight of the polyolefin pre-arm to be coupled with the backbone, the greater is the reaction time in affecting that coupling and the less complete is the substitution of the polyolefin pre-arm on the functional groups of the backbone.

The number of repeating units with functionality capable of being coupled to a plurality of polyolefin pre-arms depends, to some degree, also on the intended application of the polymer. As a general rule, it is preferred that the reactive polymeric backbone contains at least 10 functional groups through which polyolefin arms can be linked to form a highly branched structure. In the preferred practice of the invention, it is often desirable to employ a reactive polymeric backbone having the capability of forming at least 4 to 300 polyolefin arms linked to the polymeric backbone.

While it is generally preferred, as indicated above, that the reactive polymer backbones contain at least 10 functional groups through which the polyolefin arms can be coupled, it is necessary in most embodiments that the reactive polymeric backbone contains at least ten functional groups. That is so because, in most of the embodiments of this invention, the reaction to couple the polyolefin pre-arm to the reactive polymeric backbone is not quantitative with respect to utilization of backbone functionality. As explained above, the molecular weight of the polyolefin pre-arm can reduce the coupling efficiency of high molecular weight polyolefin pre-arms to the reactive polymeric backbone; that effect is often reinforced by steric factors associated with the coupling site on the reactive polymeric backbone and can prevent, with higher molecular weight polyolefin pre-arms, the coupling of polyolefin pre-arms to immediately adjacent functional groups in the polymeric backbone. In those embodiments in which it is possible to couple lower molecular weight polyolefin pre-arms the coupling reaction will proceed in a quantitative or substantially quantitative manner, and higher branched polymers can be produced with only 6 to 10 functional groups in the reactive polymeric backbone. In those embodiments in which a very low molecular weight reactive polymeric backbone is employed quantitative or substantially quantitative coupling can be achieved regardless of the molecular weight of the polyolefin pre-arms. Additionally, in embodiments where the reactive polymeric backbone exists as a branched structure, for example, dendrimers or extended isocyanates, quantitative or substantially quantitative coupling can be achieved regardless of the molecular weight of the polyolefin pre-arm.

The choice of reactive polymeric backbone and specific functionalized polyolefin pre-arm is dependent on the intended end use of the branched polymer. Pre-arms and reactive polymeric backbones are chosen so that the chemical bond coupling then will be stable under the conditions of intended use.

One suitable class of polymeric backbones used in the practice of the present invention are polyhydrosilane polymers and copolymers containing a large number of repeating units containing a silicon-hydrogen bond. In general, it is preferred to use silicon-containing polymers having repeating units of the general formula:

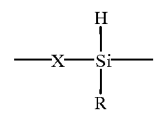

wherein X is a heteroatom, such as O, S, N, Si or one or more carbon atoms either as part of an aliphatic or aromatic group and R is hydrogen or an organic group, and preferably hydrogen, alkyl, aryl, cycloalkyl, alkoxy, aryloxy or cycloalkoxy.

Illustrative are polyhydrosiloxanes derived from an alkylhydrosiloxane end-capped with either a hydrosilane functionality or an alkylsilane functionality. Such siloxanes have the general formula:

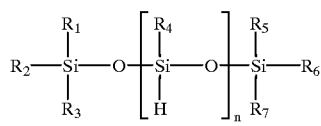

wherein $R_1$ to $R_7$ is each independently hydrogen or an organic; preferably, $R_1$ and $R_2$ can be either alkyl, aryl or cycloalkyl; $R_3$ can be either hydrogen, alkyl, aryl, cycloalkyl, alkoxy, aryloxy or cycloalkoxy; $R_4$ is hydrogen, alkyl, aryl, cycloalkyl, alkoxy, aryloxy or cycloalkoxy; $R_5$ and $R_6$ are alkyl, aryl, cycloalkyl, alkoxy, aryloxy or cycloalkoxy and $R_7$ is hydrogen, alkyl, aryl, cycloalkyl, alkoxy, aryloxy or cycloalkoxy; n is an integer having a minimum value of about 10, and preferably 25 or higher. Such siloxanes, as is well-known to those skilled in the art, are commonly available from a number of companies including Dow Corning and Rhone Poulenc.

As will also be appreciated by those skilled in the art, it is also possible to use, as the reactive polymeric backbone, siloxane copolymers containing 10 or more and typically 10 to 80 silicon-hydrogen groups as repeating units. As will also be appreciated by those skilled in the art, it is likewise possible to employ in place of the siloxanes described above, the corresponding analogs thereof in which the oxygen atom is replaced by sulfur or nitrogen atoms. Representative of suitable polyhydro-silane polymers are polymethylhydrosilane, polymethylhydrosiloxane, methylhydrodimethylsiloxane copolymer, methylhydrophenylmethylsiloxane copolymer, methylhydrocyanopropylsiloxane copolymer, methylhydromethyloctylsiloxane copolymer, poly(1,1-dimethylsilazane), poly(1,2-dimethylsilazane), (1-methylsilazane)(1,2-dimethylsilazane) copolymer and methylhydrocyclosiloxane polymer (a cyclic pre-backbone).

In general, use is made of silicon-containing polymer backbone having a number average molecular weight of 300 or higher, and preferably 300 to 10,000.

In accordance with a preferred embodiment of the invention, the pre-arms can be linked to the silicon-containing reactive polymeric backbone described above by reacting its terminal unsaturation with the Si—H bond present in repeating units in the polysilane backbone. As is well known to those skilled in the art, the reaction between the terminal unsaturation of the pre-arms and the Si—H bond of the polysilane can be carried out under conditions of heat. It is generally preferred to carry out the reaction under the influence of a suitable catalyst to effect addition of the silicon hydride across the terminal unsaturation of the olefin pre-arm to link the arm to the silicon-containing reactive polymeric backbone. Suitable hydrosilylation catalysts to effect that reaction are known in the art and include metals from groups 8 to 10 of the Periodic Table of the Elements, (in Handbook of Chemistry and Physics 70th edition, CRC press, 1989–90), including catalysts based on palladium, platinum or nickel. Catalysts which have been found to be particularly effective are $H_2PtCl_6 \cdot xH_2O (x \geq 0)$, $K[Pt(C_2H_4)Cl_3]$, $RhCl(PPh_3)_3$ or $Co_2(CO)_8$. Such catalysts and their use are described in the literature such as Lukevics et al. in J. Organomet. Chem. Lib. 1977, 5, pages 1–80.

The reaction can be carried out in accordance with a variety of reaction conditions as described in the art. It is generally possible, and sometimes desirable, to carry out the reaction in the presence of a solvent such as aliphatic hydrocarbons such as pentane, hexane, heptane, pentamethylheptane or distillation fractions; aromatic hydrocarbons such as benzene or toluene; halogenated derivatives of aliphatic or aromatic hydrocarbons such as tetrachloroethylene or ethers such as tetrahydrofuran or dioxane. The relative properties of the pre-arm and the polyhydrosilane are controlled to ensure that the desired number of polyolefin pre-arms become linked by the addition reaction to the polymeric backbone. The solution reaction is generally carried out at a concentration of 2 to 50 weight percent of polymeric reactant. The polymeric reactants are ratioed according to the moles of terminal unsaturation (C=C) in the polyolefin pre-arm to the moles of Si—H bonds in the polyhydrosilane. Because the coupling of polyolefin pre-arms to the hydrosilane groups present in the backbone controls the number of arms linked to the backbone, a molar excess of polyolefin pre-arms ensures the maximum number of polyolefin arms linked to the polymer backbone, when maximum branching is desired. In general, mole ratios ranging from 1:100 to 10:1 of the polyolefin pre-arms per mole of hydrosilane group is employed.

The reaction temperature is not a critical variable, and depends somewhat on the reactants used in carrying out the coupling reaction. Generally, temperatures ranging from 15° to 300° C. can be used for that purpose. Similarly, the reaction time is likewise not critical and depends on the reactants employed. As a general rule, reaction times are those sufficient to couple the polyolefin pre-arm to the polymer backbone, and generally range from 1 hour up to 300 hours.

As will be appreciated by those skilled in the art, the foregoing reaction generates a mixture of products, depending precisely on the structure of the polymer backbone and the structure of the polyolefin pre-arm. Nonetheless, one of the principal reactions which proceeds is the addition of the hydrosilane group across the terminal unsaturation of the polyolefin pre-arm. For example, those pre-arms containing terminal vinylidene unsaturation react according to the following equation:

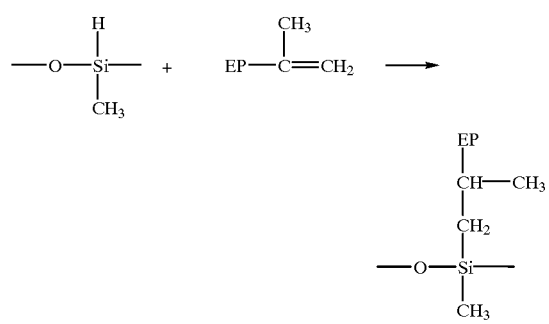

while terminal vinyl unsaturation proceeds according to the following equation:

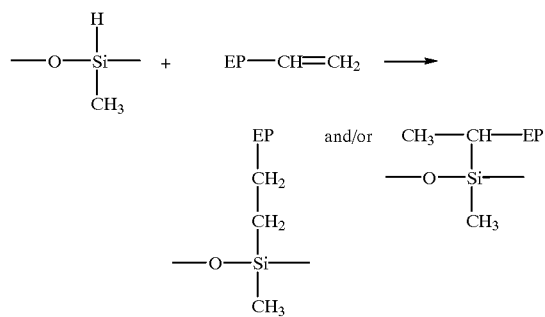

wherein EP represents the remainder of the polyolefin pre-arm.

In accordance with one variation on this embodiment of the invention, it is also possible to produce polymers of the same type by a different route in which the polyolefin pre-arm is reacted with a difunctional polymerizable monomer in the form of a simple silane compound containing the Si—H group which is then either homopolymerized or copolymerized with other silicon-containing compounds in a conventional manner. This concept of the invention thus involves the coupling of a polyolefin pre-arm with a simple hydrosilane having the structure:

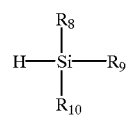

wherein $R_8$ and $R_9$ are each a hydrolyzable group such as a halogen atom and preferably chlorine or a lower alkoxy group containing 1 to 6 carbon atoms and $R_{10}$ is a readily hydrolyzable group as described above or hydrogen, alkyl, aryl or cycloalkyl.

Thus, the reaction, when the polyolefin pre-arm contains vinylidene terminal unsaturation, proceeds as follows:

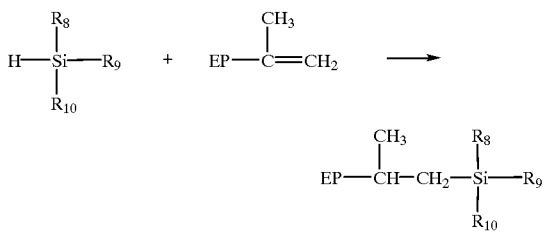

The resulting polyolefin-terminated silane can then be reacted, typically in the presence of water, to homopolymerize the silane and form the corresponding branched polymer containing polyolefin arms and a siloxane polymer backbone. It should be understood, however, that it is possible, and sometimes desirable, to utilize silanes different from that with which the polyolefin pre-arm is coupled which then can be copolymerized to form a polysilane backbone structure, having a random distribution of polyolefin arms emanating therefrom.

Optionally, if a nanogel type of branched polyolefin is desired, one would add to the reaction sequence just described a small amount of a crosslinking monomer in the form of a trialkoxysilane, a trihalosilane, an alkoxyhalosilane multi-functional silylamines and amides, etc. so that the heteroatoms of one monomer reacts with the heteroatom attached to —Si— of another monomer to form a hydrophilic core of Si-heteroatom groups with polyolefin arms attached thereto. As will be appreciated by those skilled in the art, the terminally unsaturated polyolefin pre-arm can be reacted directly with the crosslinking monomer in the presence of water to form a nanogel branched polymer.

It is also possible to copolymerize, with the polyolefin-substituted silane, other hydrolyzable silanes to form a siloxane copolymer backbone, the units of which contain polyolefin arms emanating therefrom along with repeating units from the other hydrolyzable silanes which have been copolymerized therewith. For example, it is possible to copolymerize a polyolefin-substituted silane illustrated above with, for example, dimethyldichlorosilane in which some of the repeating units of the polymer backbone contain polyolefin arms emanating therefrom while others derived from the dimethyldichlorosilane contain methyl groups appended to the silicon atom.

The conditions under which the polyolefin pre-arm is reacted with the hydrosilane monomer are like those described above for reaction between the polyolefin pre-arm and the polyhydrosilane.

In accordance with another concept of the present invention, it is possible to utilize other chemical reactions or coupling techniques to link the polyolefin pre-arm to a reactive polymer. In accordance with one embodiment, it is possible to employ, as the reactive polymeric backbone, polymers of acrylic and methacrylic acid either as a homopolymer or copolymerized with other acrylic and/or methacrylic type monomers. The acrylic and methacrylic polymers used in this embodiment of the invention are those derived from the monomeric unit having the structure:

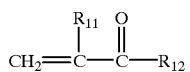

wherein $R_{11}$ is either hydrogen or lower alkyl (e.g., methyl) and $R_{12}$ is an OH group, a halogen group and preferably chlorine, an alkoxy group, or an aryloxy group. Representative of such compounds include acrylic acid, methacrylic acid, acrylyl chloride and methacrylyl chloride along with various esters of either acrylic or methacrylic acid including the alkyl and aryl ester derivatives of the two acids. As a comonomer use can be made of amino or hydroxyalkyl acrylates and methacrylates. It is sometimes desirable to employ, when using the ester, an ester leaving group to facilitate transesterification with a functionalized polyolefin pre-arm as will be described more fully hereinafter. Suitable ester-leaving groups are well known to those skilled in the art, and include tosylates and mesylates as examples.

The polyacrylic or polymethacrylic backbone embodied in the practice of the present invention should have a molecular weight sufficient to provide at least 10 and preferably at least 25 acid, acid chloride or ester groups in each backbone polymer chain. Such polymers have molecular weights $M_n$ typically ranging from 1,000 to 40,000.

The coupling of the polyolefin pre-arm to the acid, acid chloride or ester functionality of the reactive polymeric backbone can be achieved by first functionalizing the polyolefin pre-arm prepared as described above to introduce either a terminal amine group or a terminal hydroxy group, each of which is capable of undergoing reaction with the functional group contained in the polyacrylic or polymethacrylic backbone. Preferably, the hydroxy terminal polyolefin pre-arm is converted to a lithium alkoxide by reaction with n-butyllithium, followed by reaction with acrylyl chloride or methacrylyl chloride.

One such technique for converting the terminal unsaturation of the polyolefin pre-arm to either an amine or a hydroxy compound is by hydroboration. In that technique, a hydroboration reagent is added across the terminal double bond of the polyolefin pre-arm to form an organoborane derivative which can then be converted to the corresponding hydroxy compound using alkaline hydrogen peroxide or to the corresponding amine using ammonium chloride. Those reactions can be illustrated by means of the following equation:

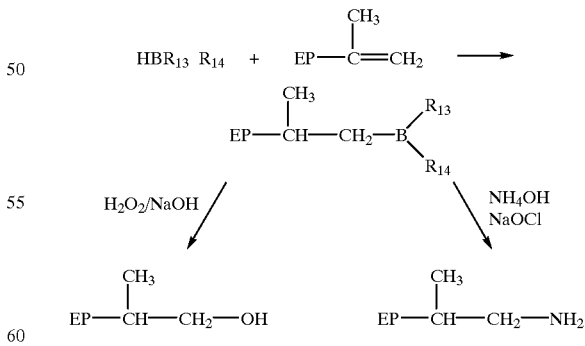

wherein $R_{13}$ and $R_{14}$ are each hydrogen and/or organic groups bonded to the boron in the hydroboration reagent. A number of such hydroboration agents are well known to those skilled in the art and can be found and their utility described in H. C. Brown, "Organic Synthesis Via Boranes" Wiley 1975. One such hydroboration reagent which can be effectively used in the practice of the present invention is 9-boronbicyclo-[3.3.1]nonane [9-BBN].

Once converted to the corresponding hydroxy or amine terminated polyolefin pre-arm, this pre-arm can then be reacted with the polyacrylic or polymethacrylic backbone in accordance with conventional techniques by which the functional group of the reactive polymer, a carboxylic acid group, an acid chloride group or an ester group reacts with the polyolefin pre-arm in the form of a hydroxy terminated compound to form the corresponding ester polyolefin arms linked to the acrylic or methacrylic polymer backbone. Similarly, the same functional groups react with an amine terminated polyolefin pre-arm to form the corresponding amide, thereby linking the polyolefin arm to the polymer backbone. Conventional esterification and amidation reaction conditions, generally in solvent, may be used to effect that coupling reaction.

Instead of using, as the polymer backbone, homopolymers of acrylic or methacrylic acid, acid chlorides or esters, use can be made, in accordance with another embodiment of the invention, of copolymers of the foregoing acrylic or methacrylic acids, acid chlorides or acid esters. Such copolymers are formed from one or more polymerizable ethylenically unsaturated monomers capable of undergoing an anionic or free radical polymerization. Preferred among comonomers with such acrylic and methacrylic monomers as described above are ethylene and lower 1-alkene such as propylene and 1-butene, styrene and styrene derivatives such as alpha methylstyrene, vinyl ethers and vinyl cyano compounds such as acrylonitrile and methacrylonitrile. Other comonomers used in the practice of this invention as copolymerizable with the acrylate and methacrylate monomers include unsaturated diacids, diesters, anhydrides such as fumeric, itaconic, maleic, a broad range of vinyl monomers such as vinyl acetate, vinylimidizole, vinyl pyridine, methyl vinyl ketone, allyl glycidyl ether, and acrylamide. The amount of one or more of the foregoing comonomers is not critical and can be varied within relatively wide ranges. In general, use can be made of 20 to 80 percent of the acrylic or methacrylic monomer and 20 to 80 percent of one or more of the foregoing comonomers. Once again, it is preferred to employ, as the polymer backbone, copolymers having molecular weights ranging from 1,000 to 40,000.

As will be appreciated by those skilled in the art, the polyolefin pre-arm can be coupled to such copolymers in the same manner as they are coupled to the acrylic and methacrylic homopolymers as described above. In either case, use is made of a molar ratio of the functionalized polyolefin pre-arm to acid, acid chloride or ester functionality or the reactive polymeric backbone to ensure the desired number of arms coupled to the backbone; this ratio is in the range of 1:100 to 10:1.

Branched polymers of the foregoing types can also be prepared by the alternate route in which the terminal amine, hydroxy, or lithium alkoxy functional polyolefin pre-arm is first reacted with a difunctional polymerizable monomer. In this embodiment, it is convenient to use an acrylic or methacrylic monomer to couple the polyolefin pre-arm through either an ester or amide coupling linkage. Once coupling of the polyolefin pre-arm is accomplished, the resulting coupled monomer can then be subjected to conventional free radical or anionic polymerization either alone or in combination with one of the foregoing comonomers to form the corresponding polymers with polyolefin arms emanating from the repeating units derived from the acrylic or methacrylic monomer. Particularly, ethylene glycol dimethacrylate which leads to secondary coupling of the comb structures can be used to give a nanogel type branched polyolefin. Once again, the reaction techniques for effecting that polymerization reaction are conventional and can be found in the literature describing conditions to effect free radical and anionic polymerization of acrylic and methacrylic monomers. See, for example, the Encyclopedia Of Polymer Science & Engineering, (1988), John Wiley & Sons, Inc., Vol. 13, pp. 1702–1867 and Vol. 1, pp. 221–224, 235–251 (Bamford).

In accordance with another embodiment of the invention, use can also be made of a reactive polymer in the form of copolymers of maleic anhydride and ethylene or copolymers of maleic anhydride, ethylene and one or more of a lower alpha-olefins such as propylene and 1-butene or styrene. In accordance with this concept of the invention, use can be made of copolymers containing 85 percent to 95 percent of ethylene and 5 percent to 15 percent of maleic anhydride. The polyolefin pre-arms, which have been functionalized to introduce either a hydroxy or an amine group can thus be coupled to the ethylene/maleic anhydride copolymer by means of ester and/or amide linkages. Alternatively, when using polyolefins functionalized with an amine, it is also possible to couple the polyolefin pre-arm to the ethylene maleic/anhydride copolymer backbone by means of imide linkages. The reaction of an amine-functionalized polyolefin pre-arm with an ethylene/maleic anhydride copolymer to form the corresponding imide may be represented by the following equation:

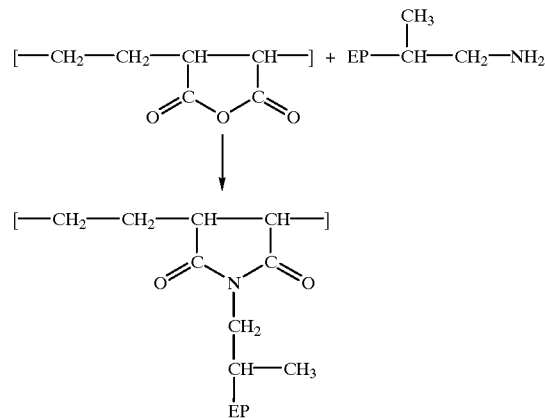

Once again, the reaction conditions for coupling hydroxy or amine functionalized polyolefin pre-arms are conventional.

As an alternative to the ethylene/maleic anhydride copolymers, use can also be made of the styrene/maleic anhydride copolymers, referred to as SMA polymers. Included as SMA polymers are those where the styrene in part may be substituted by other aryl olefins such as α-methyl styrene, vinyl naphthalene, alkyl styrenes, vinyl alkyl naphthalenes, halogen substituted styrenes, etc. In accordance with this concept of the invention, use can be made of copolymers containing 90 to 65 weight percent of styrene and 10 to 35 weight percent of maleic anhydride. Additionally, 5 to 15 weight percent of the maleic anhydride may be prereacted with simple amines such as ammonia, aniline, N-alkyl amines, alkyl substituted anilines to form the corresponding maleimide group in the SMA polymer. The SMA polymers useful in the practice of this invention can have a Mn of 500 to 55,000. Polyolefin pre-arms, which have been functionalized to introduce a terminal hydroxy or amine group, can thus be coupled to the SMA polymers through coupling with the maleic anhydride groups to form an ester, amide, or imide linkage as described previously for the ethylene/maleic anhydride backbone.

Branched polymers similar to those just described can be prepared by use of α,β-unsaturated anhydrides such as maleic anhydride as a difunctional polymerizable monomer for reaction with amine or hydroxy terminal polyolefin pre-arms. The amine or hydroxy groups reacts to provide new unsaturated polyolefin pre-arms with either an imide or an anhydride, ester bond. The unsaturation in the new pre-arm can be subjected to conventional free radical or anionic polymerization conditions either alone or with ethylene or styrene, to make copolymer backbones. Alternatively, other monomers copolymerizable with ethylene and/or styrene, for example acrylates and methacrylates, can be used to make a terpolymer backbone.

In accordance with a further embodiment of the invention, it is possible, and sometimes desirable to use, as the reactive polymeric backbone, partially hydrolyzed polymers of vinyl acetate. As is well known to those skilled in the art, vinyl acetate can be polymerized by means of a free radical polymerization mechanism to form polyvinyl acetate which can then be substantially or completely hydrolyzed using either acidic or basic conditions to remove acetyl groups pendant on the polymer backbone leaving pendant hydroxy groups. Typically, polyvinyl acetate can by hydrolyzed to the extent of 50 to 80 percent in the practice of the present invention. Thus, the polymer employed as the polymer backbone contains 50 to 80 percent alcohol groups and 20 to 50 percent vinylacetate groups. Such products are commercially available from a variety of sources.

In one variation, the vinyl acetate-vinyl alcohol polymer employed as the reactive polymeric backbone in the practice of the present invention can be converted by reaction with a $C_1$–$C_4$ aliphatic aldehyde or ketone to form the corresponding acetal or ketal, respectively. Such reactions and the polymers produced therefrom are well known to those skilled in the art and are commercially available from a variety of sources. Such polymers are referred to as poly (vinyl acetals) or poly(vinyl ketals) and generally contain the structure:

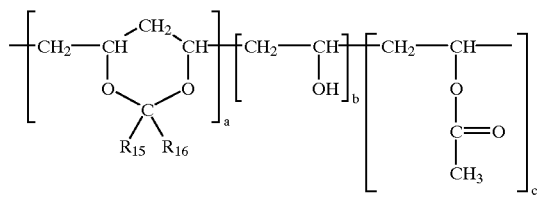

wherein $R_{15}$ and $R_{16}$ are each hydrogen or $C_1$–$C_{10}$ alkyl (e.g., methyl, ethyl, etc.). Commercially available poly(vinyl acetals) and poly(vinyl ketals) typically contain 75 to 95 percent by weight of the acetal (or ketal) (a), 6 to 25 percent by weight of vinyl alcohol (b) and 0 to 13 percent by weight of vinyl acetate (c). Those proportions are not critical to the practice of the present invention and, as will be appreciated by those skilled in the art, proportions outside those ranges can likewise be employed. While it is not critical to the practice of the invention, it is generally preferred that the polymer backbone used in this embodiment have number average molecule weight $M_n$ ranging from 1,000 to 40,000.

The polyolefin pre-arm herein can be coupled to polyvinyl alcohol/vinyl acetate or to poly(vinyl acetals/ketals) in combination with either the vinyl alcohol group or the vinyl acetate group by means of a variety of techniques. For example, use can be made of a polyolefin pre-arm which has been functionalized to introduce a carboxylic acid group as described above or the acid chloride group. When the polyolefin pre-arm has been functionalized in that way, the carboxyl group is capable of reaction with either the hydroxy functionality of the vinyl alcohol by way of an esterification reaction or with an acetate group of vinyl acetate by way of a transesterification reaction in accordance with conventional techniques.

Alternatively, use can be made of a polyolefin pre-arm which has been functionalized to introduce an ester group, such as a simple aliphatic ester or, as is sometimes preferred, an ester containing an ester leaving group such as a tosylate group or mesylate group. Such ester groups are likewise capable of reaction with either the acetate functionality or the hydroxy functionality of the reactive polymeric backbone, again in accordance with well known techniques.

Another technique by which the polyolefin pre-arm can be coupled to the polyvinyl alcohol/acetate backbone is by a reaction sequence employing a hydroxy functional polyolefin pre-arm. The terminal hydroxy group of the polyolefin pre-arm is converted to a tosylate by reactions with tosyl chloride to generate a terminal tosyl group on the polyolefin pre-arm. That has the capability of reacting directly with the hydroxy functionality of the polyvinyl alcohol/acetate in the backbone to form the corresponding ether linkage or to undergo a transesterification reaction with the acetate group to form the corresponding ester linkage.

In accordance with yet another embodiment of the invention, use can also be made, as the reactive polymeric backbones, of the polymeric structures known in the art as dendrimers. Such dendrimers are described in, for example, U.S. Pat. Nos. 4,587,329 and 4,737,550 and PCT published application Nos. WO93/14147 and WO95/02008, the disclosures of which are incorporated herein by reference. Dendrimers are three-dimensional highly branched polymer molecules comprising a core, and radiating from the core molecule a number of generations or branches. The generations of branches are composed of repeating structural units linked via various functional groups and terminated in the final generation by a functional group.

As is described in the foregoing patents, dendrimers are macromolecules formed with the aid of alternate reaction steps, starting from a core or an initiator core. Typically, the reactions occurring during the synthesis of such dendrimers are virtually selective reactions; that means that no or virtually no undesired side reactions occur.

In the preferred practice of the invention, the core molecule is a molecule which preferably contains two or more functional groups, (that is, it may undergo two or more chemical reactions) and may range as high as ten or more functional groups. The core may be chosen from the group of ammonia, water, methanol, polymethylenediamines, diethylenetriamine, diethylenetetramine, tetraethylenepentamine, linear and branched polyethylene imine, methylamine, hydroxyethylamine, octadecylamine, polyaminoalkylarenes, such as 1,3,5 tris-(aminomethyl) benzene, tris(aminoalkyl)amines, such as tris(aminomethyl) benzene, tris(aminoalkyl)amines, such as tris(aminoethyl) amine, heterocyclic amines, such as imidazolines and piperidines, hydroxyethylaminoethylamine, mercaptoethyl amine, morpholine, piperazine, pentaerythritol, sorbitol, mannitol, duleitol, inositol, polyalkylenepolyols, such as polyethylene glycol and polypropylene glycol, glycols, such as ethylene glycol, 1,2-dimercaptoethane, polyalkylene polymercaptans, phosphine, ε-aminocaproic acid, glycine, thiophenols, phenols, melamine and derivatives thereof, such as melamine tris(hexamethylenediamine). In the process according to the invention, use is preferably made of a core that is chosen from the group comprising polymethylene diamines, glycols and tris(1,3,5-aminomethyl)benzene (AEB). Polymethylenediamines, that are more preferably used as a core are hexamethylenediamine, ethylenediamine and 1,4-diaminobutane (DAB)

If so desired, it is also possible to use a copolymer containing the above functional groups as a core for the dendritic macromolecule. Examples of such copolymers are styrene-maleimide copolymer, polyethyleneimine and polymers such as polypropylene oxide, polystyrene and ethylene-propylene-diene copolymers that are functionalized with one or more of the above functional groups, such as $NH_2$ groups.

The core molecule is thereafter reacted with a polyfunctional compound, and preferably a polyfunctional compound which, when reacted with the core molecule, forms a dendrimer having either terminal amine groups, terminal hydroxy groups or other terminal functional groups such as alkylester groups. Thus, the dendrimer generations preferred for use in the practice of the present invention utilize, as the repeating unit, polyether, polyamidoamines, polyethyleneimines or polyalkylenepolyamines. One typical example of a dendrimer is formed with ammonia, as the core molecule. Ammonia is reacted, via a "Michael addition", with an excess of the polyfunctional compound methylacrylate, thus:

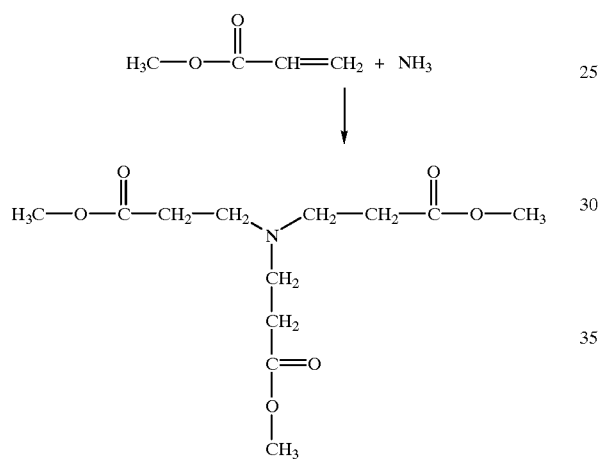

The foregoing structure is then next reacted with a polyfunctional compound such as an alkylenediamine to yield the following structure to form a polyamidoamine, thus:

Each generation thereafter is added by alternating reactions of methylacrylate and ethylenediamine. If desired, the polyfunctional compound can be changed at any point in the sequence to vary the structure being produced or alternatively the reaction sequence can be stopped at a half generation.

In general, use is made, as the polyfunctional compound, of a wide variety of compounds capable of reaction with the core in the ordered sequence outlined above. Polyfunctional groups which may be employed in the practice of the present invention are generally known in the prior art. For example, as described in U.S. Pat. No. 4,587,329, there is described polyfunctional groups containing functional groups such as amino, nitrile, hydroxy, mercapto, carboxy, carboxyalkyl, amido, halo, urea, oxiranyl, aziridinyl, oxazolinyl, imidazolinyl, sulfanato, phosphonato, isocyanato, isothiocyanato and combinations thereof. Alkylesters of acrylic and methacrylic esters are examples and can be used in combination with alkylenediamines as one example to add each generation to the dendrimer core. Other polyfunctional compounds may likewise be employed as are described in the literature. One example are the vinylcyanides having the structure:

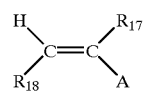

where $R_{17}$=H or —$CH_3$; A=—C≡N; and $R_{18}$ is hydrogen or a hydrocarbon group with 1 to 8 carbon atoms.

Very suitable vinyl-cyanide units that can be used are acrylonitrile and methacrylonitrile.

As will be appreciated by those skilled in the art, a dendrimer can be produced by reaction of acrylonitrile with as the core 1,4-diaminobutane, according to the following reaction:

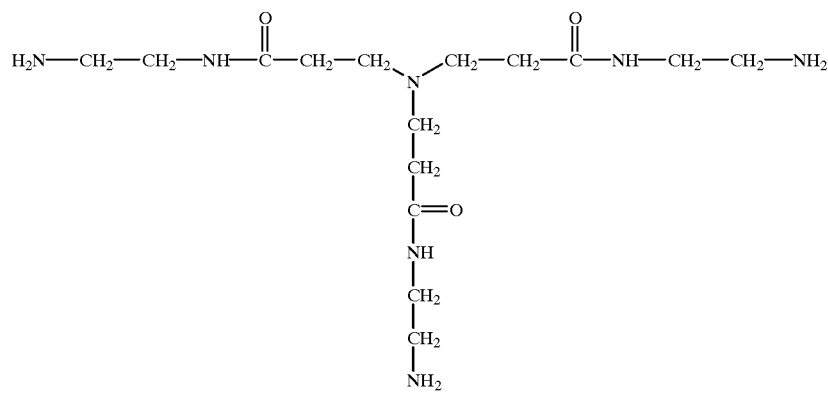

The above reaction sequence represents one generation.

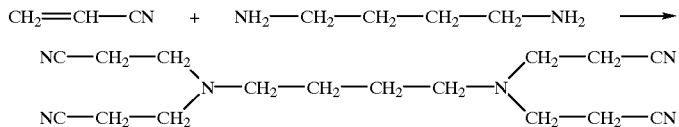

In the above structure, the cyano groups are hydrogenated to the corresponding amine groups to terminate the first generation. These amines which are then capable of undergoing further reaction with a polyfunctional monomer, which may be either the same or different from the polyfunctional group used earlier in the sequence. For example, it is possible to react the foregoing amine terminated compound with additional quantities of acrylonitrile, or it is also possible to use a completely different difunctional monomer such as an alkylester or methylacrylate ster as described above. In general, the dendrimers employed in the practice of this invention have number average molecular weights ranging from 300 to 10,000, once again, depending in part on the structures desired in the final macromolecule. The number of polyolefin pre-arms coupled to the dendrimer type of backbone will depend on the number of branches or endgroups in the dendrimer molecule. In the practice of this invention, dendrimers of 1 to 5 generations with 4 to 64 branches or end groups can find utility.

A number of different approaches can be taken in preparing dendrimers for use in the present invention. For example, 1,3,5-tris(aminomethyl)benzene can be reacted with acrylonitrile to form, as the second generation dendrimer, a dendrimer containing twelve amino groups:

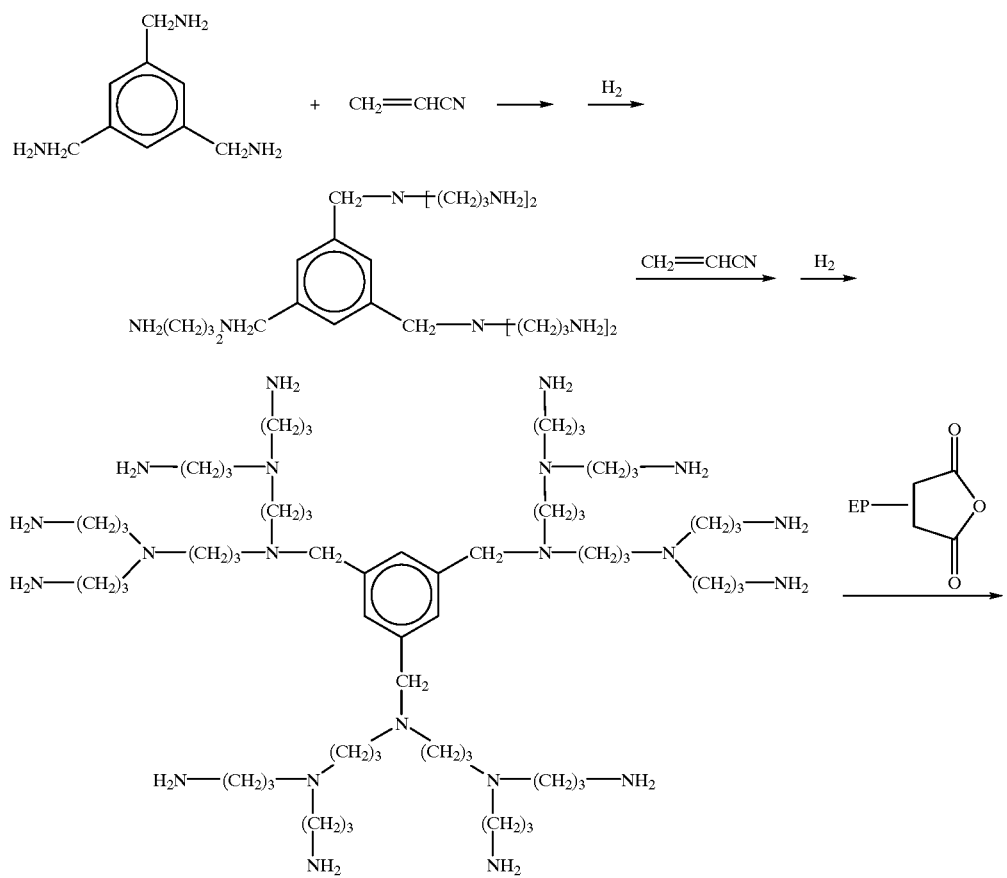

-continued

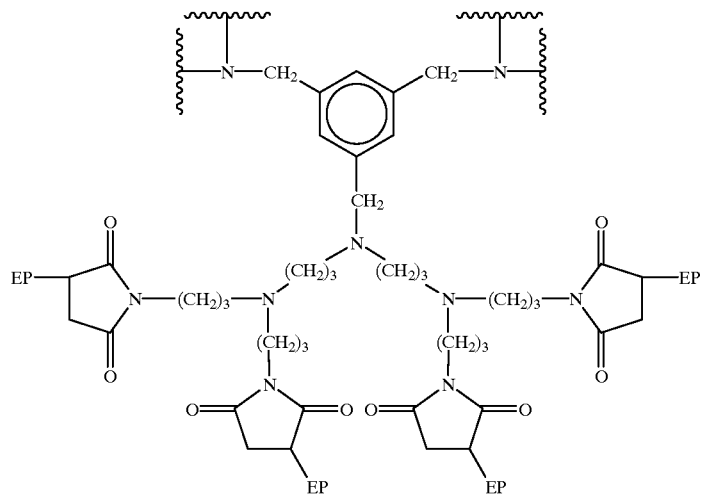

The polyolefin pre-arm can be coupled to the free amine or hydroxy groups of the foregoing dendrimers by first functionalizing the terminally unsaturated polyolefin to provide on the polyolefin a functional group capable of reaction with such amino or hydroxy groups. As is known to those skilled in the art, the polyolefin pre-arm can be functionalized to introduce a carboxylic anhydride group or an acid chloride group, either of which can be reacted with the amino or hydroxy group of the dendrimer to couple the polyolefin arm to the dendrimer to form a highly branched structure. The carboxyl group and/or the acid chloride can be conveniently produced by a number of techniques.

One technique is to carry out a hydroboration reaction and react the organoborane with carbon dioxide to form the corresponding acid group which can then be easily converted to its corresponding acid chloride. Alternatively, as described above, the polyolefin pre-arm can be reacted with maleic anhydride by way of, for example, an ene reaction. Alternatively, it is also possible to convert the polyolefin pre-arm to the corresponding aldehyde by means of a hydroformylation reaction using catalysts derived from cobalt or rhodium well known for that purpose. The aldehyde derivatized polyolefin pre-arm can then be reacted with the dendrimer containing terminal amine groups via a Schiff-base reaction to give an imine bond which alternatively can be hydrogenated for added heat stability or can provide a new double bond for other chemical modifications.

Alternatively, a hydroxy terminal polyolefin pre-arm can be converted to its tosylate by reaction with tosyl chloride. The tosylate terminated polyolefin pre-arm can react with either an amine terminal dendrimer to form an amine linkage or with the hydroxy terminated dendrimer to form an ether linkage of the polyolefin pre-arm.

Alternatively, it is also possible to convert the polyolefin pre-arm to the corresponding epoxide which then is capable of reaction with either a free amino group or hydroxy group present in the dendrimer. Epoxidation can likewise be effected using peracid chemistry which is well known to those skilled in the art.

In each case, the derivatized polyolefin pre-arm is capable of reaction with the hydroxy or amino groups of the dendrimer backbone to form a highly branched polymer having the dendrimer as the core or backbone with polyolefin arms extending therefrom. Highly branched polymers of the same general type can also be prepared by extending the amine or hydroxy terminal group present in the dendrimer backbone with a molecule containing an isocyanate or isothiocyanate group. The free isocyanate or isothiocyanate group thus present in the new dendrimer backbone can be reacted with the polyolefin pre-arm which has been derivatized as described above to introduce either hydroxyl termination or amine termination, introduced in the polyolefin pre-arm by way of the hydroboration reaction described above. These branched polymers have polyolefin arms coupled to the dendrimer backbone via the very thermally stable urethane or urea linkage. That series of reactions can be illustrated for a selectively blocked multifunctional isocyanate by way of the following equations:

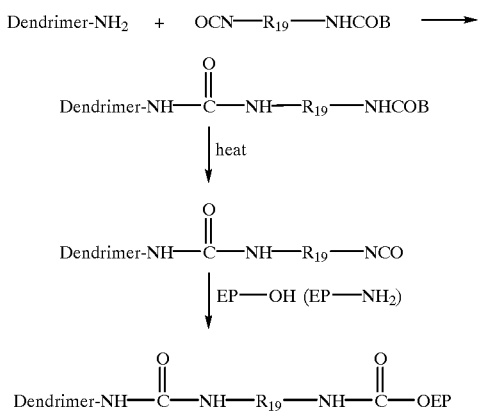

The group —NHCOB— in the above reaction sequence represents a blocked isocyanate function and $R_{19}$ is the remainder of the isocyanate and, preferably, is an alkyl, aryl, cycloalkyl or alkylary group. The blocking molecule can be any of a variety of molecules with an active hydrogen. The blocking molecule can be removed thermally in a subsequent reaction at generally 150° C.–250° C. Typical blocking molecules are phenol, ketoximes, such as methylethyl ketoxime, secondary alcohols such as 2-ethyl hexanol, caprolactam. Reaction conditions to effect blocking and deblocking are well-known in the art.

As an alternate approach to use of selectively blocked diisocyanates use can be made of vinyl isocyanates such as isocyanatoethyl methacrylates (IEM) or m-isopropenyl α,α-dimethyl benzyl isocyanate (TMI). The isocyanate functionality of the IEM or TMI is preferably blocked then incorporated into the dendrimer molecule by way of the conventional Michael reaction with an amine terminal dendrimer. As described previously, the isocyanate function is then regenerated by subjecting the dendrimer to heat to effect deblocking and then reacted with an amine or hydroxy terminal polyolefin pre-arm as illustrated in the following equations:

-continued

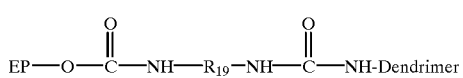

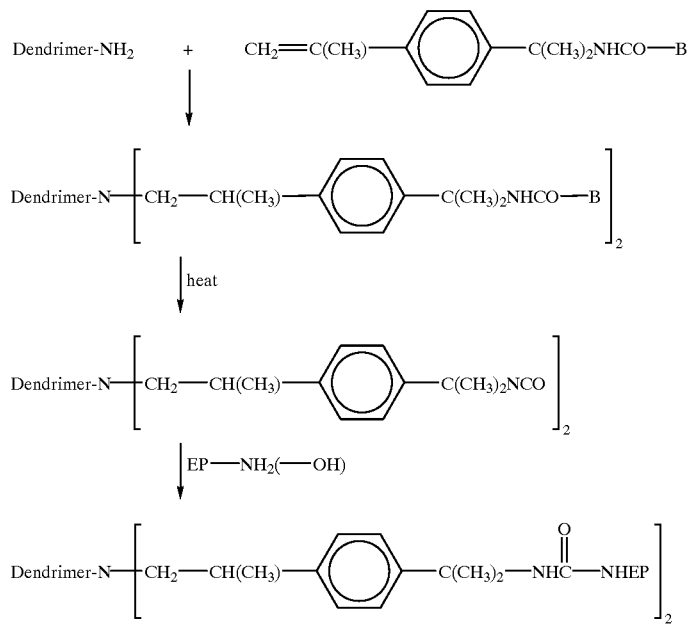

The number of polyolefin arms possible in the above type of branched polymers is generally two times the number of amine terminal branches in the starting dendrimer and typically selection is made of dendrimers with 4 to 16 amine terminal branches.

Alternatively, the polyolefin pre-arm which has been derivatized to introduce to it either a hydroxy or an amine terminal group can be reacted with, as a difunctional monomer, a selectively blocked multi-functional isocyanate or isothiocyanate. This derivatized polyolefin pre-arm can be subjected to heat to deblock the isocyanate functionality and in a second reaction step then be reacted with the amine or hydroxy terminal groups of the dendrimer. The pre-reaction of the isocyanate with the polyolefin pre-arm may be illustrated by way of the following:

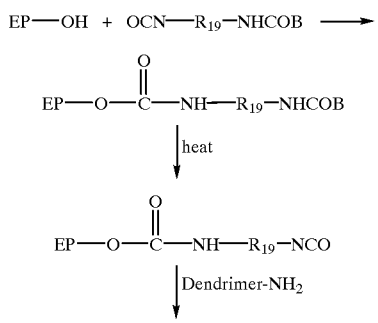

In both cases, the polyolefin pre-arm becomes coupled to the dendrimer backbone via urea urethane bonds.

As will be appreciated by those skilled in the art, instead of isocyanates, use can be made of other polyfunctional coupling compounds to link chemically the polyolefin pre-arms to the functional groups of the dendrimer. Also suitable as such linking compounds are di- and tricarboxylic acids and their corresponding esters or anhydrides, amino alkyl alcohols and haloalkyl amines, haloalkyl alchols.

Particularly useful in the preparation of star branched polyolefins is the dendrimer-like backbone obtained from Michael reaction of symmetrical polyamines with unsaturated polycarboxylic acid esters, such as the reaction of methyl itaconate with tris(ethylamino) benzene wherein the first generation product provides twelve carboxy sites for coupling of polyolefin arms. The first generation dendrimer can be expanded with alternating reactions of, for example, 1,4-diaminobutane and methylitaconate or the core amine, tris(ethylamino) benzene can be expanded with one or more generations of N-tosylaziridine to expand the number of arms. With methyl itaconate the number of branches is expanded by a factor of four for each amino group in the core or branched dendrimer backbone:

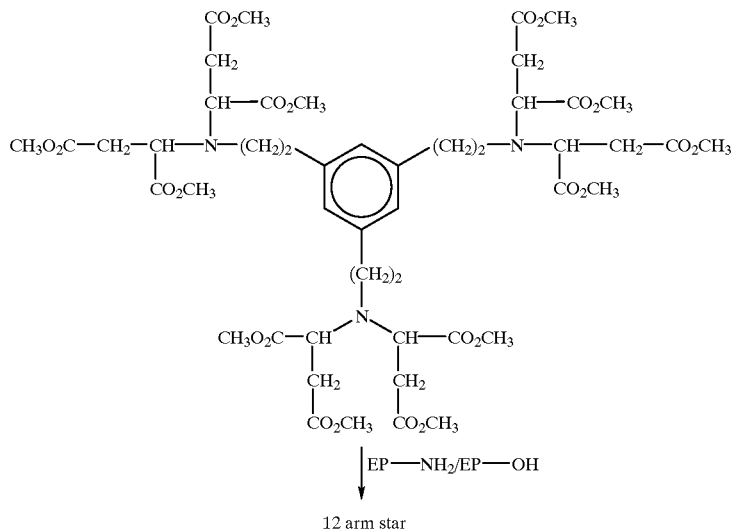

12 arm star

Useful as melamine derivatives in preparation of dendrimer backbones are structures defined by the formula:

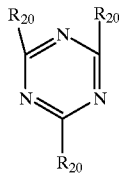

wherein $R_{20}$ is $NH_2-(CH_2)_xOH$, $-(CH_2)_xNH_2$, $-NH(CH_2)_xCO_2H$, $-NH(CH_2)_xOH$, $-NH(CH_2)_xNH_2$ or $-COCH_3$, and x is 1–5.

In the typical preparation of a dendrimer, the reaction

In the next step, the generation is completed for the above-described dendrimer by reaction with an aromatic polyamine compound having antioxidant properties. A number of such compounds are known, including 4,4'-diaminodiphenylamine. Other suitable compound are aminoalkyl substituted phenothiazines; representative of the latter group is 4,4'bis-(2-aminoethyl)phenothiazine. Those compounds, containing aromatic amine groups, are reactive with the terminal groups of the dendrimer containing the acetate groups to form the corresponding amides with the aromatic polyamines. The new dendrimer backbone is the product of that reaction, and can be illustrated by way of the following:

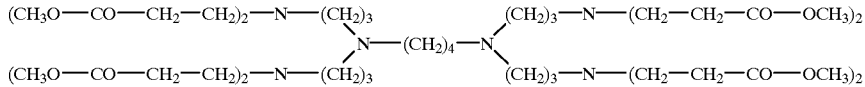

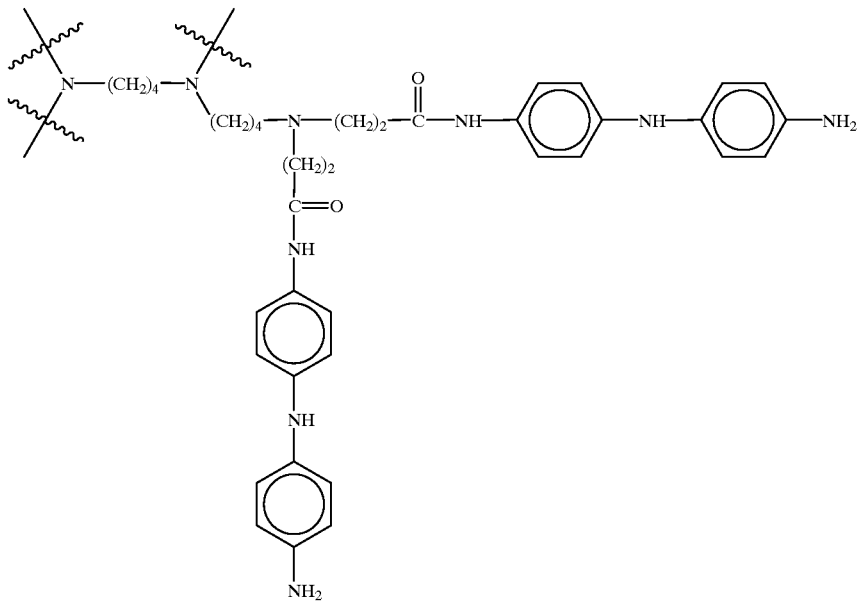

It will be understood that the unsatisfied bonds in the foregoing structure contain the same groups.

That dendrimer backbone, containing terminal amine groups, can then be reacted with a functionalized polyolefin pre-arm containing, for example, a terminal maleic anhydride group to thereby couple the polyolefin pre-arm to the amine groups to form an imide linking the polyolefin pre-arm to the dendrimer structure. The macromolecules thus contain both the polyolefin arm, as well as a aromatic polyamine group to improve the antioxidant characteristics of the dendrimer. It will be noted that each branch of the polymer containing the polyolefin arm also contains an aromatic polyamine group in a one-to-one distribution.

As will be appreciated by those skilled in the art, use can also be made instead of the 4,4'bis-(2-aminoethyl) phenothiazine, the phenothiozines described above, as well as other aromatic polyamine compounds.

As will also be appreciated by those skilled in the art, other sequences of reagents in forming the dendrimer may likewise be used. It is important, however, that the immediately preceding dendrimer prior to reaction with the aromatic polyamine compound have a functional group which is reactive with the aromatic polyamine group so as to incorporate the antioxidant-containing aromatic polyamine compound into the dendrimer molecule. As will also be appreciated by those skilled in the art, other coupling mechanisms previously described may likewise be used to couple the polyolefin pre-arm to the terminal amine of this type of dendrimer molecule. Instead of a polyolefin pre-arm containing a maleic anhydride group, it is also possible to employ a polyolefin pre-arm functionalized with a terminal expoxy group or a terminal carboxylic acid or an acid chloride group or a tosylate.

As an alternative technique one can couple polyolefin pre-arm directly via a polymerization reaction by incorporation of difunctional polymerizable monomers in the form of vinyl isocyanates. Examples of such monomers are IEM and TMI as previously described. In accordance with this embodiment, the amine or hydroxy terminal polyolefin is directly reacted with the TMI or IEM via the isocyanate functionality to provide a new unsaturated polyolefin pre-arm with a urea, urethane bond. The unsaturation in this new pre-arm can be subjected to conventional free radical or anionic polymerization conditions either alone or in combination with other styrene-like or (meth)acrylate-like comonomers known to undergo such copolymerization reactions. Branched polymers as thus described can be exemplified by the following equation using styrene and methyl methacrylate as comonomers:

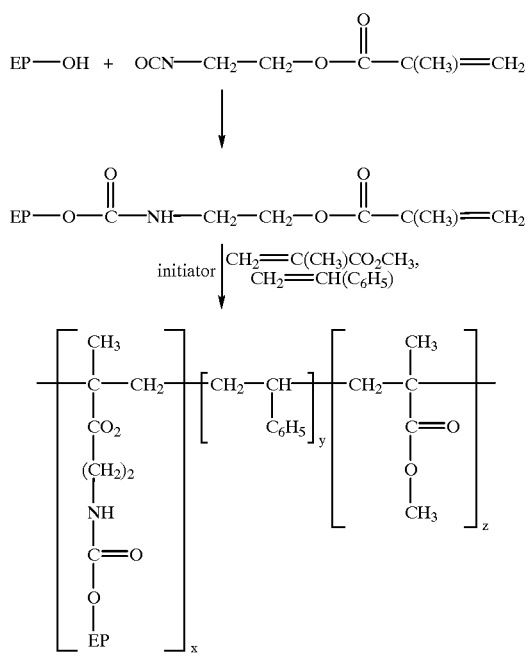

wherein x is 5 to 30 weight percent IEM derivatized polyolefin arm, y is 25 to 65 weight percent styrene and z is 30 to 70 weight percent methylmethacrylate.

It is also possible, in accordance with a further embodiment of the invention, to utilize, in forming a reactive polymeric backbone, multifunctional isocyanates or extended isocyanates. One technique that can be employed is based on the known ability of isocyanates to trimerize to form a very stable six-member ring structure. Such compounds are known as isocyanurates, and have the structure:

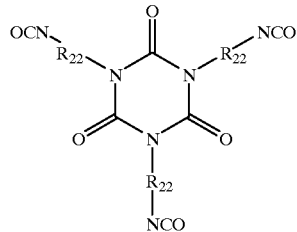

wherein each $R_{22}$ group is an alkyl group of 1 to 8 carbons, an aryl group, an alkyl phenyl group. Some more common isocyanurates commerically available are the trimers from the trimerization of 1,6-diisocyanato hexamethylene, 2,4-toluene diisocyanate, isophoronediisocyanate, toluidine diisocyanate, 4,4'dicyclohexylmethane diisocyanate. The isocyanurate can be reacted with an amine or hydroxy terminal polyolefin pre-arm to provide a branched polyolefin with three arms. Alternatively, as more typical with higher molecular weight polyolefins, the reaction will stop after the incorporation of one to two arms providing instead a "linear polyolefin". Those "linear polyolefins" can be coupled with monomer having multi-hydroxy or multi-amine functions, as provided by simple polyols and melamines or its derivatives as previously defined. Polyols useful in the practice of this invention include glycerine, glycols, pentaerythritol, Pluracol® polyols, benzenes, tris(alkylamino) benzene, trimethylolpropane, trihydroxybenzene, triaminobenzene, first generation dendrimer like molecules formed by reaction of diamines (or poly amines) with ethylene oxide, such as Quadrols® (trademark of BASF Wyandotte Corporation) tricarboxylic acids, etc. Branched polyolefins with 6 to 24 arms coupled by way of a urea/urethane linkage are conveniently prepared.

Use of "extended isocyanates" as a backbone of this invention relies on the reaction of selective diisocyanates with polyols or melamines followed by a secondary trimerization with the corresponding selectively blocked diisocyanate as represented in the following equation when an excess of toluene diisocyanate is reacted with pentaerythritol:

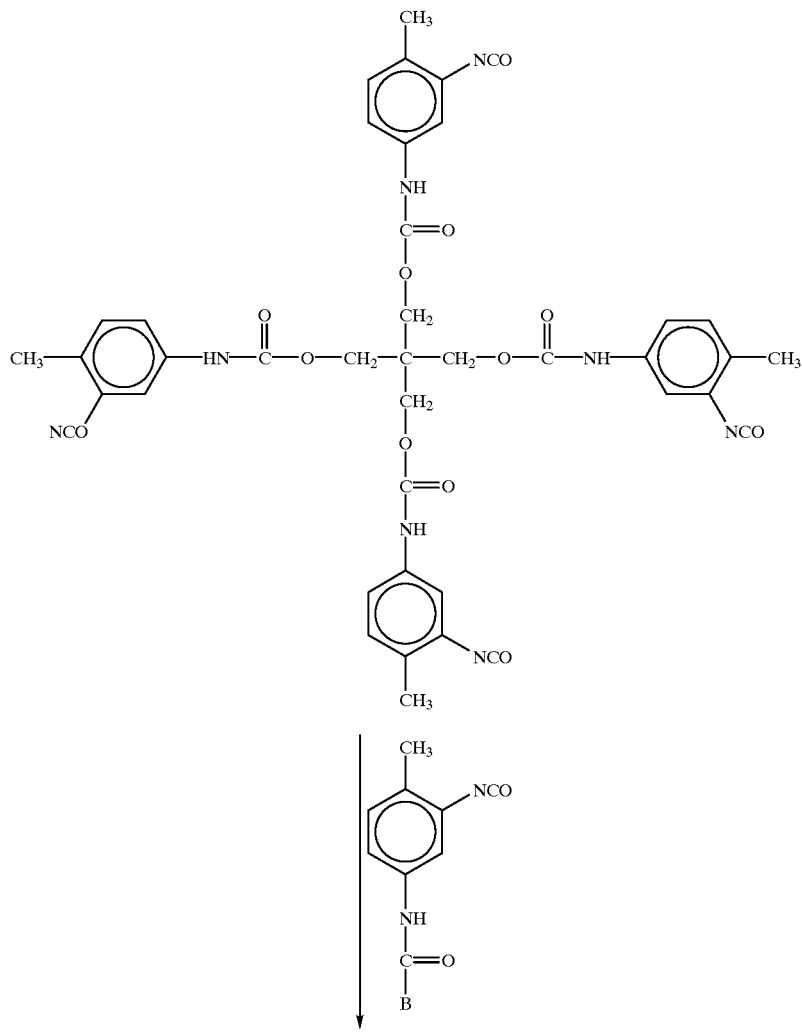

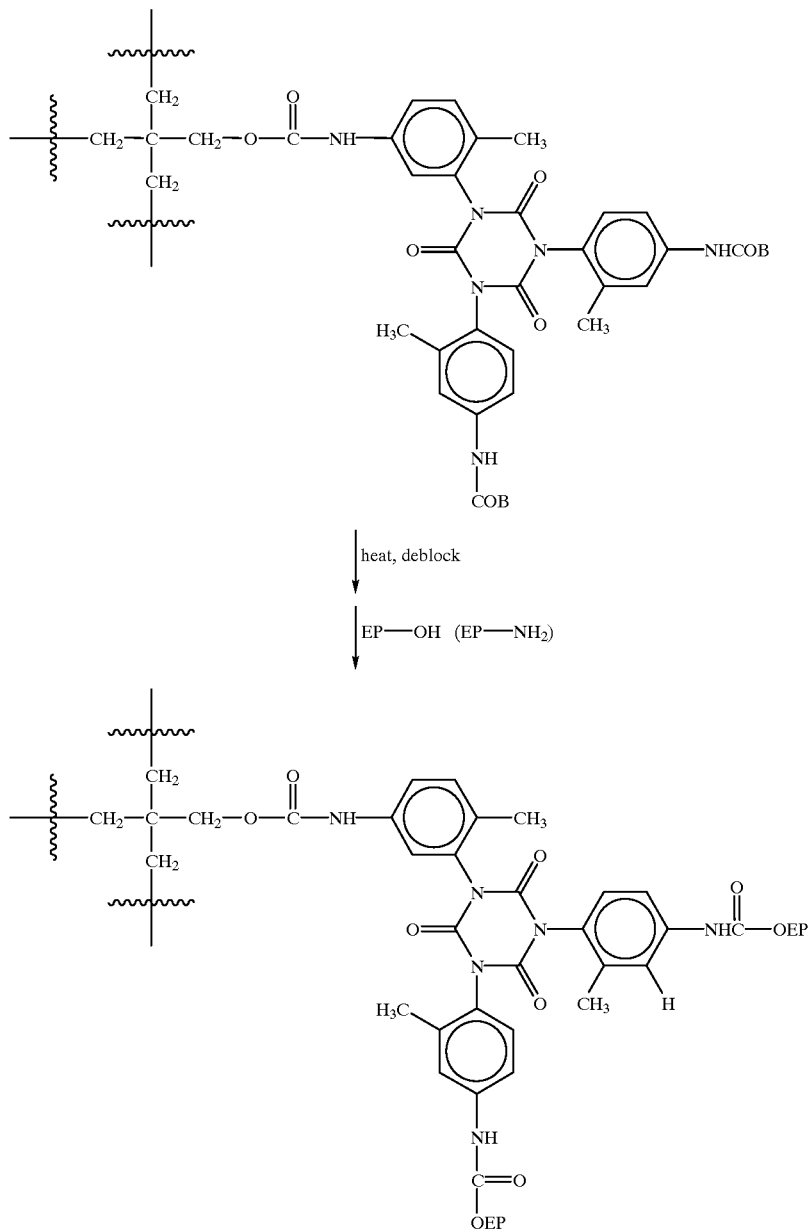

By "selective diisocyanate" it is understood in the art that the two NCO groups are not equally reactive, that is, one of the NCO groups will preferrably undergo blocking and trimerization reactions leaving the other NCO for later chemical modification. Toluene diisocyanate and isophorone diisocyanate (see J. Coatings Technology, Vol. 54, no. 687, 1982, pg. 43) are examples of selective diisocyanates.

An "extended isocyanate" backbone can also be prepared by alternating the reactions of polyols and selective diisocyanates. An example of this type of backbone is formed by the reaction of first trimethylol propane with toluene diisocyanate. The para NCO group reacts exclusively and this chemical is sold under the tradename Mondur®CB (Mobay Corporation). Reaction of Mondur CB with pentaerythritol provides a core molecule with nine hydroxy groups. These can be reacted with an equivalent of toluene diisocyanate to provide a branched backbone with nine isocyanate groups which when reacted with hydoxy or amino terminal polyolefins generates a nine arm star branched polyolefin.

Branched polyolefins of the present invention, once formed, are stable and can be modified by additional chemical reactions. One such reaction is functionalization by means of a free radical graft reaction or a graft polymerization reaction. Polyolefin grafted polymers are themselves well known to those skilled in the art. Similar chemical reactions can be used to graft the branched polyolefins of this invention. Suitable graft monomers include unsaturated dicarboxylic acid anhydrides and their corresponding acids, preferably those having the general formula:

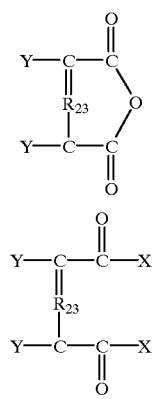

wherein $R_{23}$ is an alkyl group having 0 to 4 carbon atoms and Y is preferably hydrogen but may also be an organic group such as a branched or straight chain alkyl group, an anhydride, a ketone group, a heterocyclic group or other organic group containing 1 to 12 carbon atoms. In addition, Y can be a halogen such as chlorine, bromine or iodine. X can be OH or an alkoxy group wherein the alkyl group contains 1 to 8 carbon atoms. Preferred among those graft monomers are maleic anhydride, itaconic anhydride.

Also suitable as the graft monomer for functionalizing an EP(D)M branched polyolefin are the derivatives of olefinically unsaturated carboxylic monomers such as, acrylic or methacrylic acid, or their esters, graft monomers which are likewise known to those skilled in the art. Typically, acrylic and methacrylic acid derivative contain 4 to 16 carbon atoms. Preferred among the acrylic and methacrylic acid graft monomers are those having the structure:

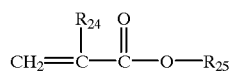

wherein $R_{24}$ is hydrogen or $C_1$ to $C_4$ alkyl (e.g., methyl, ethyl, etc.) and $R_{25}$ is selected from the group consisting of a $C_1$ to $C_8$ alkyl group, a keto functional alkyl group, an epoxy functional alkyl group, $-NH_2$ or $-NR'_2$ where R' can be H or $C_1$ to $C_8$ hydrocarbon and both R' groups need not be the same. Particularly preferred among the group of acrylic or methacrylic graft monomers are glycidyl methacrylate, methylacrylate, methylmethacrylate, ethylmethacrylate and aminopropylmethacrylate, and acrylamide.

Another group of graft monomers which can be used to functionalize an EP(D)M branched polyolefin are vinyl amines containing 2 to 25 carbon atoms, and preferably heterocyclic vinyl amines. Such amines are themselves known as functionalizing graft monomers and include allylamines, N-vinylpyridines, N-vinylpyrroli-dones, vinyl lactams, vinylcarbazoles, vinylimidazoles and vinylthiazoles as represented by 2-vinylpyridine, N-vinylpyrrolidone, vinyl caprolactam, 1-vinylimidazole, allylamine, 4-methyl-5-vinylthiazole and 9-vinylcarbazole. Such graft monomers are described in detail in U.S. Pat. No. 4,340,689, the disclosure of which is incorporated herein by reference.

As it will be appreciated by those skilled in the art, other vinyl monomers described in the prior art as suitable for functionalizing such EP(D)M branched polyolefin may likewise be used in the practice of the present invention. Examples of such further vinyl compounds are the vinyl silanes and vinylbenzyl halides as represented by vinyltrimethoxysilane, vinyldiethychlorosilane, vinylbenzylchloride and the like. Further descriptions of suitable silane graft monomers are described in U.S. Pat. No. 4,340,689, the disclosure of which is incorporated herein by reference.

The following examples are provided to illustrate the invention.

The composition of the polymers was determined by means of Fourier Transform Infrared Spectroscopy. The molecular weight of the polymers was determined with Size Exclusion Chromatography-Differential Viscometry (SEC-DV) at a temperature of 150° C. using 1,2,4-trichlorobenzene as solvent. The SEC-DV technique was used to calculate the number average molecular weight (Mn), the weight average molecular weight (Mw) and the molecular weight distribution (MWD–Mw/Mn). The number of arms on the branched polymer was defined as the ratio of the molecular weight at the top of the SEC-DV chromatogram of the branched polymer to the molecular weight at the top of the SEC-DV chromatogram of the original polyolefin (before the coupling reaction). Therefore, the number of arms as defined herein was the mean number of arms on the backbone for that experiment. The type and degree of terminal unsaturation was determined by Proton Nuclear Magnetic Resonance Spectroscopy ($^1$H-NMR) and are reported as groups per 100,000 carbon atoms.

Preparation of Terminally Unsaturated Polyolefins

Polymer A

An ethylene-propylene polymerization was performed in a 1.5 liter (l) batch reactor. The reactor was fed with 300 ml hexane. Subsequently the reactor was pressurized with ethylene (C2) and propylene (C3) to 0.8 MPa and conditioned in order to reach a molar ratio of propylene to ethylene in the headspace of 2:1. The temperature of the reactor was maintained at 40° C. Next 4 micromoles of $S(2\text{-Ind})_2ZrCl_2$ (sulphur bridged di-indenyl zirconium dichloride) and 5 mmoles of methylaluminoxane were fed to the reactor. During the polymerization the monomer concentrations were kept constant as much as possible by dosing 200 standard liter/hour (sl/hr) propylene and 100 sl/hr ethylene to the reactor. After 30 minutes the polymerization was ended by depressurizing the reactor. The polymer solution was recovered, the solvent evaporated and the polymer was dried in vacuo at 80° C.

Analysis of the polymer resulted in the following data:

Mn (g/mole)=1,320 C3 (wt %): 56

Mw (g/mole)=2,500 395 vinyl groups

MWD=1.9 935 vinylidene groups

Polymer B

An ethylene-propylene polymerization was performed in a 1.5 l continuous stirred type reactor. Solvent, monomers and catalyst components were continuously fed to the reactor and the polymer solution was continuously removed from the reactor. The following parameters were used:

Hexane (kg/hr)=1.67 Catalyst [$Et(1\text{-Ind})_2ZrCl_2$] (μmole/hr)=20

Ethylene (sl/hr)=138 Cocatalyst (methylaluminoxane) (mmole/hr)=10

Propylene (sl/hr)=429 Polymerization temperature (° C.)=35

Production (g/hr)=173 Reactor residence time (min)=15

Analysis of the polymer resulted in the following data:
  Mn (kg/mole)=28 C$_3$ (wt %)=53
  Mw (kg/mole)=61 9 vinyl groups
  MWD=2.1 40 vinylidene groups

Polymer C

An ethylene-propylene polymerization was performed as above for Polymer B. Solvent, monomers and catalyst components were continuously fed to the reactor and the polymer solution was continuously removed from the reactor. The following parameters were used:
  Hexane (kg/hr)=1.64 Catalyst [Et(1-Ind)$_2$ZrCl$_2$] ($\mu$mole/hr)=25
  Ethylene (sl/hr)=143 Cocatalyst (methylaluminoxane) (mmole/hr)=12
  Propylene (sl/hr)=442 Polymerization temperature (° C.)=40
  Production (g/hr)=189 Reactor residence time (min)=15
Analysis of the polymer resulted in the following data:
  Mn (kg/mole)=24 C3 (wt %)=52
  Mw (kg/mole)=58 17 vinyl groups
  MWD=2.5 50 vinylidene groups

Polymer D

An ethylene polymerization was performed in accordance with the procedure for Polymer A. The reactor was fed with 750 ml pentamethylheptane. Subsequently, the reactor was pressurized with ethylene solely to 0.8 MPa. The temperature of the reactor was maintained at 185° C. Next a MgCl$_2$ supported Ti-catalyst (Ti-concentration is 0.002 mmole/l) and 0.05 mmole/l of triethylaluminum were fed to the reactor. During the polymerization the ethylene pressure was kept constant as much as possible. After 10 minutes the polymerization was terminated by depressurizing the reactor. The polymer was recovered by evaporating the solvent and drying under vacuum at 60° C. The analysis on the polymer was as follows:
  Mn (kg/mole)=16 43 vinyl groups
  MW (kg/mole)=55 6 internal C=C
  MWD=3.5

Polymer E

A propylene polymerization was performed in accordance with the procedure for Polymer A. The reactor was fed with 500 ml heptane. Subsequently, the reactor was pressurized with propylene solely to 0.7 MPa. The temperature of the reactor was maintained at 40° C. Next 10 micromoles of Me$_2$Si(2,4Me$_2$Cp)$_2$ZrCl$_2$ [dimethylsilyl bridged di(2,4-dimethylcyclopentadiene) zirconium dichloride] and 32 mmoles of methyl aluminoxane were fed to the reactor. During the polymerization the propylene pressure was kept constant as much as possible. After 30 minutes the polymerization was terminated by depressurizing the reactor. The polymer was recovered by evaporating the solvent and drying under vacuum at 60° C. Analysis gave the following results:
  Mn (kg/mole)=5.5 250 vinylidene groups
  Mw (kg/mole)=9.2
  MWD=1.7

Polymer F

An ethylene-propylene-1-octene terpolymerization was performed according to the procedure for Polymer B. Solvent, monomers and catalyst components were continuously fed to the reactor and the polymer solution was continuously removed from the reactor. The following parameters were used:
  Hexane (kg/hr)=2.32 Catalyst VOCl$_3$/promoter (mmole/hr)=0.8/3.2
  Ethylene (sl/hr)=91 Cocatalyst (Et$_2$AlCl) (mmole/hr)=21
  Propylene (sl/hr)=153 Polymerization temperature (° C.)=39
  Octene (ml/hr)=214 Reactor residence time (min)=13
  Production (g/hr)=190
Dichlorophenyl acetic acid ethyl ester was used as a promoter for the catalyst.
Analysis of the polymer resulted in the following data:
  Mn (kg/mole)=32 C2/C3/C8 (mole %)=66/28/5
  Mw (kg/mole)=76 4 vinyl groups
  MWD=2.4 18 vinylidene groups
    19 trans vinyl groups

Purification of Polyolefins

In some cases, it was necessary to facilitate functionalization or coupling of the ethylene-propylene copolymers to remove catalyst and co-catlysts residues. Polymers were dissolved in hexane and washed with 4N hydrogen chloride solution. The hexane layer was subsequently washed with water for 3 times, then the hexane was evaporated and the resulting polymer was dried at 80° C. in vacuo. in tetrahydrofuran were mixed at a molar ratio of 1000/1. A Polymethylhydrosiloxane containing an average of 48 Si—H groups per molecule was added to the reaction mixture to provide a molar ratio of Si—H to C=C in Polymer B of 5/1. The reaction mixture was stirred at 90° C. for 5 days, with an equivalent aliquot of catalyst added each day. The polymer recovered after evaporation of the solvent under vacuum at 80° C. was analyzed by SEC-DV to contain 10 arms.

EXAMPLE 4

Polymer C was reacted with Polymethylhydrosiloxane according to the procedure of Example 3 at a molar ratio Si—H to C=C in Polymer C of 6/1. The polymer recovered from this reaction was analyzed to contain 8 arms.

EXAMPLE 5

Polymer C dissolved in toluene and Pt(PPh$_3$)$_4$ also dissolved in toluene were mixed at a molar ratio of 1000/1. The Polymethylhydrosiloxane used in Example 1 was added to the reaction mixture to provide a molar ratio of Si—H to C=C in Polymer C of 5/1. After stirring the reaction mixture at 40° C. for 5 days, a polymer was recovered which was analyzed to contain 46 arms.

EXAMPLE 6

Polymer D, a terminally unsaturated Polyethylene, dissolved in xylene and H$_2$PtCl$_6$.6H$_2$O dissolved in tetrahydrofuran were mixed at a molar ratio of 1000/1. The Polymethylhydrosiloxane of Example 1 dissolved in toluene was added to provide a molar ratio of Si—H to C=C in Polymer D of 5/1. The resulting mixture was stirred at 110° C. for 4 days. Polymer recovered after evaporation of the solvent at 80° C. under vacuum analyzed to contain 4 arms.

EXAMPLE 7

Polymer E, a terminally unsaturated Polypropylene, was reacted according to the procedure of Example 6. The recovered polymer was analyzed to contain 8 arms.

EXAMPLE 8

Polymer F, a terminally unsaturated terpolymer, was reacted according to Example 6 with the following exceptions: Pt(PPh$_3$)$_4$ dissolved in toluene was employed as the catalyst and the reaction mixture was stirred at 90° C. for 14 days. The recovered polymer was analyzed to contain 6 arms.

Preparation of Silane Terminated Polyolefin and its Polymerization to Produce a Polysiloxane Backbone with Polyolefin Arms

EXAMPLE 9

Polymer A dissolved in toluene was mixed with HSiCl$_3$ (trichlorosilane) dissolved in toluene at a molar ratio of 1 C=C in Polymer A per 30 Si—H. H$_2$PtCl$_6$.6H$_2$O dissolved in isopropanol was added to the reaction mixture at a mole ratio of 0.012/C=C. The reaction was allowed to stir at 25° C. for 2 days, then polymer was recovered by evaporation of the solvent and excess trichlorosilane at 80° C. under vacuum.

The recovered polymer was then redissolved in toluene. 3 Moles of butanol were added and reaction was allowed to proceed with stirring for 1 day at 60° C. After the addition of excess water, the mixture was stirred for 1 additional day. The recovered polymer contained 20 arms.

Hydroxy and Amine Derivatization of Terminally Unsaturated Polyolefins

EXAMPLE 10

(a) Polymer A dissolved in tetrahydrofuran and 9-Borabicyclo[3.3.1] nonane (9-BBN) dissolved in tetrahydrofuran were mixed in a 1/1 molar ratio of B—H to C=C in Polymer A. The reaction mixture was stirred at 40° C. for 2 hours.

(b) The above reaction mixture was cooled to 0° C. Sodium hydroxide (6M in water, oxygen free) and hydrogen peroxide (30% in water) were added both in a molar ratio of ingredient to C=C in Polymer A of 1.9/1 and 7.5/1, respectively. This mixture was then heated to 50° C. and the temperature maintained for 2 hours while stirring. The organic solvent was removed by evaporation and the resulting mixture was dissolved in petrol. After separation of the layers, the organic layer was washed with 5% HCL solution and then three times with water. The Petrol was evaporated to recover the hydroxy terminated Polymer A (Polymer A-OH) which was subsequently dried at 60° C. under vacuum.

(c) A reaction mixture prepared according to procedure (a) above was treated at a 1/1 molar ratio of C=C in Polymer A to N in ammonium hydroxide with NH$_4$OH solution (25 wt %, oxygen free) at room temperature. A solution containing an equimolar quantity of NaOCl (13 wt % active Cl, oxygen free) was then slowly added and the resulting reaction mixture was stirred for an additional 3 to 4 hours. The organic solvent was evaporated and Petrol added to dissolved the polymer. Three equivalents of methanol were added to precipitate the polymer. The amine terminated Polymer A (Polymer A-NH$_2$)was recovered by filtration and dried under vacuum at 60° C.

Reaction of Hydroxy or Amine Terminal Polyolefin with Polyacrylyl Chloride

EXAMPLE 11

(a) Polymer A-OH, prepared according to example 10(b), was dissolved in tetrahydrofuran and mixed with polyacrylyl chloride (Mw=2000) dissolved in tetrahydrofuran to provide a molar ratio of —OH in Polyolefin to polyacrylyl chloride of 1/0.065. A catalytic amount of pyridine was added and the solution stirred at 50° C. for 5 days. Polymer recovered after evaporation of the solvent at 80° C. under vacuum measured 18 arms. The polyolefin arms were linked via ester groups.

(b) Polymer A-NH$_2$, prepared according to example 10(c), is dissolved in tetrahydrofuran and is reacted with polyacrylyl chloride (Mw=2000) as in the above example 11(a). A 19 arm polyolefin branched polymer is recovered. The polyolefin arms are linked via amide groups.

Free Radical Polymerization of Methacrylate Terminated Polyolefin

EXAMPLE 12

(a) Polymer A-OH, prepared according to example 10(b), was dissolved in methylene chloride and reacted with an excess of methacrylyl chloride in the presence of a catalytic amount of pyridine by stirring at room temperature for 3 days. The methacrylate terminated polyolefin (Polymer A-O-MA) was recovered and purified by conventional techniques.

(b) The methacrylate terminated polyolefin was dissolved in tetrahydrofuran and mixed with dicumyl peroxide at a molar ratio of 1/0.16 C=C/peroxide. The solution was heated at 200° C. for 3 hours. The solvent was evaporated at 80° C. under vacuum and the residue dissolved in petrol. Methanol was added to precipitate polymer which after drying under vacuum at 60° C. was analyzed to contain 29 arms. The polyolefin arms were linked via ester groups.

Copolymerization of a Methacrylate Terminated Polyolefin with Ethylene Glycoldimethacrylate

EXAMPLE 13

The methacrylate terminated Polymer B (Polymer B-O-MA) was prepared according to the steps of Example 10a, b, and 12a and purified. This polymer was dissolved in tetrahydrofuran and methyl methacrylate and ethylene glycol dimethacrylate added in a molar ratio of acrylate monomer to Polymer B-O-MA of 16/1 and 3/1, respectively. Azobisisobutyronitrile was added to the reaction mixture at a more ratio of 0.16/1 C=C in polymer. The mixture was then heated at 60° C. for 72 hours. The solvent was evaporated at 80° C. under vacuum to recover the branched polymer which by SEC-DV analysis showed 123 arms.

Copolymerization of Borated Polyolefin with Methacrylate Monomers

EXAMPLE 14

Polymer B was dissolved in tetrahydrofuran and mixed with 9-BBN also dissolved in tetrahydrofuran at a molar ratio of 1/1, B—H per C=C in Polymer B. This mixture was heated at 40° C. and stirred for 2 hours. Next methyl methacrylate and ethylene glycol dimethacrylate were added in a molar ratio of acrylate monomer to Polymer B of 100/1 and 10/1, respectively. To this solution was added oxygen in 5 increments. The mixture was then heated to 50° C. and stirred for 24 hours. The solvent was evaporated at 80° C. under vacuum. The resulting branched copolymer was measured to have 52 arms.

Polyalkenylene Amine Dendrimer with Polyolefin Arms

EXAMPLE 15

(a) Preparation of Maleic Anhydride Terminated Polyolefin

Polymer A dissolved in toluene was treated with 9-BBN also dissolved in toluene at a 1:1 molar ratio of C=C in Polymer A to B—H bonds. This mixture was heated to 40° C. and stirred at temperature for 2 hours. Afterwards, maleic anhydride was added to the hot reaction mixture at a molar ratio of 1:1 based on moles C=C in starting Polymer A. Air was admitted to the reaction vessel and the mixture stirred at 50° C. for 2 days. A maleic anhydride terminated Polymer A (Polymer A-MAh) was recovered after purification.

(b) To the purified Polymer A-MAh dissolved in tetrahydrofuran a second generation Dendrimer, DAB $(PA)_4(PA)_8$, prepared from 1,4-diaminobutane, acrylonitrile and hydrogen according to Examples I through IV of WO 93/14147, was added at a ratio of 1:1 molar ratio of MA group attached to Polymer A to —$NH_2$ group of the Dendrimer. The reaction mixture was heated to 50° C. and the temperature maintained there while stirring for 18 hours. The solvent was evaporated and the residue dissolved in m-xylene. The m-xylene solution was heated to 160° C. with removal of water via the azeotrope in order to force the coupled product to the imide form. After 5 hours water removal was complete and the m-xylene was evaporated under vacuum at 80° C. The resulting polymer was characterized by SEC-DV to have 8 arms.

Isocyanate Backbone with Polyolefin Arms

EXAMPLE 16

Polymer A was converted to a Polymer A-OH via the procedure of Example 10a, b, and dissolved in tetrahydrofuran. Tolonate HDT, a tri-isocyanate formed by trimerization of 1,6-diisocyanato hexamethylene, was dissolved in tetrahydrofuran and added at a molar ratio of 1/2 trimer molecules per Polymer A-OH. A catalytic amount of dibutyltinlaurate was added to the reaction which was then heated to 50° C. with stirring for 6 hours. Then pentaerythritol dissolved in tetrahydrofuran was added to the reaction mixture at a molar ratio of 0.125/1 of hydroxy terminal Polymer A. This mixture was stirred an additional 12 hours. Branched polymer recovered from the reaction was analyzed to have 8 polyolefin arms linked via urethane bonds.

Diaminodiphenylamine Terminal Dendrimer with Polyolefin Arms

EXAMPLE 17

(a) Preparation of Dendrimer Terminated with 4,4'-Diaminodiphenylamine

Dendrimer, $AEB(PA)_6$ is prepared from 1,3,5 tri (aminoethyl) benzene as core and one generation of acrylonitrile/hydrogen according to Example 1-II of WO 93/14147. The six terminal amino groups of $AEB(PA)_6$ are reacted with excess methylacrylate according to the procedure of Example C of U.S. Pat. No. 4,587,329 at a mole ratio of 21 methacrylates to 1 Dendrimer to give the $AEB(PA)_6(MA)_{12}$. This Dendrimer is dissolved in methanol and 4,4'-diamino, diphenyl amine (DADPA) in methanol is mixed at a molar ratio of 2.5 diamine/per mole of ester groups. The mixture is held at room temperature and stirred for 60 hours. The excess diamine and methanol are removed by vacuum distillation. The residue analyzed for —CONH-groups and no residual —$CO_2CH_3$ and is used directly in (c).

(b) Preparation of Tosylate Terminated Polyolefin

Polymer B-OH is prepared according to Example 10a, b and purified. It is then dissolved in toluene. Pyridine is added at a mole ratio of 10 moles per mole of OH in Polymer B-OH. Then p-Toluenesulfonyl chloride is slowly added at a mole ratio of 1.5 mole per mole of OH. This mixture is stirred at room temperature for 24 hours, then is treated with an equal volume of HCl and ice, 1:1. The layers are separated, the toluene solution washed with water, and the Tosylate terminated Polymer B (Polymer B-OTos) is recovered by removal of solvent under vacuum at 30° C.

(c) Reaction of Polymer B-OTos with $(AEB)(PA)_6(MA)_{12}(DADPA)_{12}$

The Dendrimer dissolved in tetrahydrofuran and Polymer B-OTos also dissolved in tetrahydrofuran are mixed and heated to 100° C. for 36 hours. The solution is then cooled to room temperature and enough aqueous KOH is added to make the mixture basic. The layers are separated and the tetrahydrofuran is evaporated under vacuum at 80° C. The resulting branched Polymer B is analyzed to have 12 polyolefin arms linked via an amine group.

Polymerization of Vinylurea Terminated Polyolefin

EXAMPLE 18

(a) Reaction of Amine Terminal Polymer A with Vinyl Isocyanate

Polymer A-$NH_2$ is prepared according to the procedure of Example 10a, c. The purified Polymer A-$NH_2$ is dissolved in dry toluene and mixed with m-isopropenyl-α,α-dimethylbenzyl isocyanate dissolved in dry toluene at a 1:1 molar ratio of Polymer A-$NH_2$ to —NCO. Dibutyl tindilaurate is added as catalyst at a concentration of 0.15 mole % of reactants. The mixture is warmed to 35° C. and stirred for 6 hours or until disappearance of the NCO peak in the infrared spectra. The vinylurea Polymer A is precipitated with methanol and dried under vacuum at 50° C.

(b) Free Radical Polymerization

The vinylurea Polymer A is redissolved in dry toluene. Styrene and methyl methacrylate are added at a molar ratio of 5/1 and 10/1 monomer to vinyl polymer, respectively. Azoisobutyronitrile at a molar ratio of 0.15/1 of monomers is added and the reaction is heated to 60° C. Stirring is continued for 24 hrs. after which the solvent and any unreacted monomer is evaporated. The residue is dissolved in petrol and precipitated in methanol. The branched polymer is dried under vacuum at 60° C. and analyzed to have 33 polyolefin arms.

Reaction of SMA Polymer with Polymer A-$NH_2$

EXAMPLE 19

Polymer A-$NH_2$ is prepared by the procedure of Example 10a, c. Purified Polymer A-$NH_2$ is then dissolved in tetrahydrofuran and mixed with a styrene/maleic anhydride copolymer (Maleic anhydride content 30 wt %, Mn=20,000) also dissolved in tetrahy drofuran at a molar ratio of anhydride groups to amine groups of 2/1. The reaction mixture was heated to 60° C. and stirred for 5 days. The solvent is evaporated and the residue is dissolved in m-xylene. The m-xylene solution is heated to 160° C. and water removed as the azeotrope to force the reaction to the imide form. After 7 hours the m-xylene was evaporated under vacuum at 80° C. The resulting polymer is characterized by SEC-DV to have 30 arms.

Poly(vinyl formal) with Polyolefin Arms

EXAMPLE 20

Polymer B-OTos is prepared according to the procedure of Examples 10a, b, 17c and dissolved in tetrahydrofuran. A poly(vinyl formal) (acetalization 60 mol %, alcohol 35 mol %, Mn=10,000) is also dissolved in THF. The two solutions are mixed to provide a mole ratio of alcohol functionality to tosylate groups of 15/1. This mixture is stirred at 80° C. for 5 days. The solvent is removed under vacuum and the residue is analyzed by SEC-DV to have a branched polyolefin with 12 arms.

Preparation of a Nanogel Structure

EXAMPLE 21A

Polymer C dissolved in toluene was mixed with $H_2PtCl_6 6H_2O$ dissolved in isopropanol at a molar ratio of 1000/1. A poly-methylhydrosiloxane (PMHS) containing an average of 48 Si—H groups per molecule was added to the reaction mixture to provide a molar ratio of Si—H to C=C in Polymer C of 5/1. The reaction mixture was stirred at 90° C. for 3 days. Then, 1,7-octadiene in a 1/1 molar ratio to the C=C in Polymer C was added and the reaction continued. After 2 days the reaction was blocked with an excess of 1-octene. The polymer recovered after evaporation of the solvent under vacuum at 80° C. was analyzed by SEC-DV to contain 6 arms.

EXAMPLE 21B

Polymer C dissolved in toluene and $H_2PtCl_6-6H_2O$ dissolved in isopropanol were mixed in a molar ratio of 1000/1. A PMHS containing an average of 48 Si—H groups per molecule was added to the reaction mixture to provide a molar ratio of Si—H to C=C in Polymer C of 5/1. Additionally, Tetramethyltetravinylcyclotetrasiloxane (TMTVS) was added to the reaction mixture to provide a molar ratio of C=C (in TMTVS) to Si—H in PMHS of 0.7. The reaction mixture was stirred at 90° C. for 3 days. After 3 days, the reaction was blocked with an excess of 1-octene. The polymer recovered after evaporation of the solvent under vacuum at 80° C. was analyzed by SEC-DV to contain 27 arms.

EXAMPLE 21C

Conditions of Example 21B were repeated with the exception that TMTVS was added at a molar ratio of C=C (in TMTVS) to Si—H in PHMS of 0.3. The polymer recovered after evaporation of the solvent under vacuum at 80° C. was analyzed by SEC-DV to contain 10 arms.

Polyester Amine Dendrimer with Polyolefin Arm

EXAMPLE 22

Tris(aminoethyl)benzene, AEB, and 25 percent excess methyl itaconate (MI) are reacted in methanol at 40° C. according to the procedure outlined in Example 1 of WO 93/14147 for 24 hours. The $AES(MI)_6$ half generation dendrimer is recrystallized from methanol after removal of excess MI and methanol by vacuum distillation.

The $AES(MI)_6$ is dissolved in tetrahydrofuran and is mixed with Polymer B-OH also dissolved in tetrahydrofuran at a molar ratio of 1/12, respectively. The solution is stirred at 100° C. for 48 hours. The temperature is then reduced to 60° C. and the solvent is evaporated under vacuum. The resulting branched polymers are analyzed to have 12 arms linked via an ester group.

Isocyanate Terminal Dendrimer with Amine Terminal Polyolefin

EXAMPLE 23

TMI and methyl-ethyl ketoxine (MEK) are mized in a 1:1 molar ratio in a flask maintaining the temperature at 40° C. by slow addition of the ketoxime. Potassium octanate (0.1 wt % based on solid wt. of reactants) dissolved in xylene is added to the mixture and the temperature increased to 85° C. The temperature is maintained at 85° C. for 1½ hours then reduced to 30° C. The amine terminal dendrimer, $DAB(PA)_4(PA)_8$ dissolved in xylene is added to the xylene solution of TMI-MEK at a molar ratio of 1/8, respectively. The reaction mixture is maintained at 50° C. for 20 hours. The solvent is evaporated and the blocked isocyanate dendrimer $DAB(PA)_4(PA)_8(TMI)$ is recrystallized from methanol.

The $DAB(PA)_4(PA)_8(TM-B)_8$ is heated under vacuum at 10 mm Hg with a nitrogen purge at 130° C. for 30 minutes to effect deblocking. The temperature is reduced to ambient and the $DAB(PA)_4(PA)_8(TMI)$ dissolved in xylene. Polymer A-$NH_2$ dissolved in xylene is added to the dendrimer at a molar ratio of 8/1, respectively. The solution is heated to 50° C. and stirred fro 24 hours. The solvent is evaporated under vacuum and recovered polymer analyzed to have 8 arms linked via urea bond.

Reaction of Hydroxy Terminal Polyolefin with Extended Isocyanate Backbone

EXAMPLE 24

The trifunctional isocyanate Mondur CB is dissolved in tetrahydrofuran (THF) and is slowly added to a reaction flask under nitrogen simultaneously with slow addition of a pentaerythritol solution in THF. The reactants are mixed at a ratio of 3 moles pentaerythritol to 1 mole Mondur CB over a period of 1.5 hours, after which a catalytic amount of tin octanoate is added. The solution is stirred under nitrogen for an additional one hour at 60° C. The solution from this reaction is transferred under $N_2$ to a second addition vessel for slow mixing in a reaction flask with a solution of toluene diisocyanate (TDI) dissolved in THF. The TDI and the first reaction solution are mixed at a mole ratio 9 to 1 over a period of 1.5 hours. A second addition of tin octanoate is made and the solution is warmed to 60° C. Stirring at 60° C. is continued for two hours. The mixture is cooled to room temperature and Polymer A-OH is added at a ratio of 9/1 Polymer A-OH to initial Mondur CB. The reaction mixture is warmed to 60° C. and is stirred for two days. The THF is removed under vacuum and the residue dissolved in hexane at 30° C. Methanol is added slowly to precipitate the polymer. The precipitate is collected and is dried under vacuum at 80° C. The branched polymer is characertized by SEC-DV to have 9 arms.

What is claimed is:

1. A branched polyolefin polymer in the form of a comb, star, nanogel and structural combinations thereof comprising a plurality of polyolefin arms selected from the group consisting of (1) polymers of ethylene, (2) polymers of propylene and (3) copolymers of ethylene with one or more 1-alkenes, said arms being linked to the polymeric backbone, wherein the reactive polymeric backbone is formed from a siloxane having the general formula:

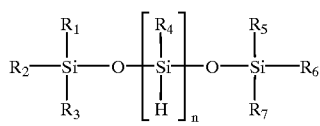

wherein $R_1$ to $R_7$ is each independently hydrogen or an organic group and n is an integer of at least 25 and said backbone contains at least 4–300 polyolefin arms and said branched polyolefin polymer is prepared by coupling the polyolefin prearms with said polymeric backbone.

2. A branched polymer as defined in claim 1 wherein the group R of the silicon-containing polymeric backbone is hydrogen, alkyl, aryl, cycloalkyl, alkoxy, aryloxy or cycloalkoxy.

3. A branched polymer as defined in claim 1 wherein the polyolefin arms are copolymers of ethylene and at least one other 1-alkene copolymerized therewith containing 3 to 20 carbon atoms.

4. A branched polymer as defined in claim 1 wherein the polyolefin arm is a copolymer of ethylene, propylene and at least of other 1-alkene copolymerizable therewith, said 1-alkene containing 4 to 20 carbon atoms.

5. A branched polymer as defined in claim 1 wherein the polyolefin pre-arm contains terminal ethylenic unsaturation selected from the group consisting of vinyl unsaturation, vinylidene unsaturation and vinylene unsaturation.

6. A branched polymer as defined in claim 5 wherein the terminal unsaturation is reacted with functional groups in the reactive polymeric backbone.

7. A branched polymer as defined in claim 1 wherein the polyolefin pre-arms contain terminal unsaturation in the form of vinyl unsaturation or vinylidene unsaturation.

8. A branched polymer as defined in claim 1 wherein the polyolefin pre-arm is an ethylene-propylene copolymer having terminal unsaturation.

9. A branched polymer as defined in claim 1 wherein the polyolefin pre-arm is polyethylene having terminal unsaturation.

10. A branched polymer as defined in claim 1 wherein the polyolefin pre-arm is polypropylene having terminal unsaturation.

11. A branched polymer as defined in claim 1 wherein the polyolefin arm is an interpolymer of ethylene, propylene and at least one polyene monomer copolymerized therewith containing two or more carbon-to-carbon double bonds and 4 to 20 carbon atoms.

12. A branched polymer as defined in claim 11 wherein the polyene is selected from the group consisting of non-cyclic polyene monomers, monocyclic polyene monomers and polycyclic polyene monomers.

13. A branched polymer as defined in claim 11 wherein the polyene monomer is selected from the group consisting of 1,4-hexadiene, dicyclopentadiene, norbornadiene, 5-methylene-2-norbornene, 5-ethylidene-2-norbornene, vinyl norbornene and the alkyl norbornadienes.

14. A branched polymer as defined in claim 11 wherein the polyene is present within the range of about 0.1 to about 20 percent based on the total weight of the polyolefin arm.

15. A branched polymer as defined in claim 1 wherein the polyolefin pre-arms are produced by polymerization with a metallocene catalyst system.

16. A branched polymer as defined in claim 1 wherein the polyolefin pre-arms each have a number average molecular weight ranging between about 50 and about 100,000.

17. A branched polymer as defined in claim 1 wherein the wherein the molecular weight distribution of the polyolefin pre-arm ranges from about 1.2 to about 3.5.

18. A branched polymer as defined in claim 1 wherein the polyolefin pre-arm is a copolymer of ethylene and 1-octene having terminal unsaturation.

19. A branched polymer as defined in claim 1 which has a nanogel structure formed by the coupling of comb and star branched polyolefins with a crosslinking monomer.

* * * * *